United States Patent [19]

Levinson et al.

[11] 4,277,644
[45] Jul. 7, 1981

[54] SYNTACTIC CONTINUOUS SPEECH RECOGNIZER

[75] Inventors: Stephen E. Levinson, Westfield; Frank C. Pirz, Madison, both of N.J.

[73] Assignee: Bell Telephone Laboratories, Incorporated, Murray Hill, N.J.

[21] Appl. No.: 57,749

[22] Filed: Jul. 16, 1979

[51] Int. Cl.³ .............................................. G10L 1/00
[52] U.S. Cl. ........................ 179/1 SD; 340/146.3 WD
[58] Field of Search ............. 179/1 SD, 1 SB, 1 VC; 340/146.3 WD

[56] References Cited

U.S. PATENT DOCUMENTS

| | | | |
|---|---|---|---|
| 3,553,372 | 1/1971 | Wright | 179/1 SD |
| 3,816,722 | 6/1974 | Sakoe et al. | 179/1 SA |
| 4,049,913 | 9/1977 | Sakoe | 179/1 SD |
| 4,059,725 | 11/1977 | Sakoe | 179/1 SD |
| 4,092,493 | 5/1978 | Rabiner et al. | 179/1 SD |
| 4,107,460 | 8/1978 | Grunza et al. | 179/1 SD |
| 4,156,868 | 5/1979 | Levinson | 179/1 SD |

OTHER PUBLICATIONS

L. Rabiner, et al., "Considerations in Dynamic ... Recognition", IEEE Trans. Ac. Speech and Sig. Proc., Dec. 1978, pp. 575–582.
R. Alter, "Utilization of Contextual Constraints etc.", IEEE Trans. Audio Electroacoustics, Mar. 1968, pp. 6–11.

*Primary Examiner*—Mark E. Nusbaum
*Assistant Examiner*—E. S. Kemeny
*Attorney, Agent, or Firm*—Jack Saul Cubert

[57] ABSTRACT

The accuracy of segmenting an utterance into words is improved by the use of sequence-defining signals. An utterance is recognized as one of a plurality of reference word sequences in an arrangement wherein a set of signals is generated to define the syntax, i.e., word arrangements, of the sequences. Each sequence corresponds to a selected series of reference words. A signal is generated to identify the successive word positions of the sequences. Responsive to the sequence defining signals, the utterance, and the reference words, a set of signals is produced, each representing the correspondence between said utterance and one of the sequences. The sequence having the closest correspondence to the utterance is selected. The sequence correspondence signal generation includes selecting, in each identified word position, the word position reference word for each sequence and the portion of the utterance corresponding thereto responsive to said sequence defining signals, and generating a signal representative of the acoustic correspondence between each sequence word position reference word and its selected utterance portion.

15 Claims, 11 Drawing Figures

FIG. 6

| L | $q_p$ | $\omega_j$ | $q_s$ | FSF |
|---|---|---|---|---|
| 1 | 1 | $\omega_3$ | 2 | |
| 2 | 2 | $\omega_4$ | 3 | |
| 3 | 3 | $\omega_7$ | 4 | |
| 4 | 4 | $\omega_8$ | 5 | 1 |
| 5 | 5 | $\omega_9$ | 6 | 1 |
| 6 | 2 | $\omega_5$ | 7 | |
| 7 | 7 | $\omega_6$ | 3 | |
| 8 | 2 | $\omega_{22}$ | 22 | |
| 9 | 22 | $\omega_{23}$ | 23 | |
| 10 | 23 | $\omega_{24}$ | 24 | |
| 11 | 24 | $\omega_{25}$ | 6 | 1 |
| 12 | 3 | $\omega_{12}$ | 15 | |
| 13 | 15 | $\omega_{17}$ | 16 | |
| 14 | 16 | $\omega_{18}$ | 17 | |
| 15 | 17 | $\omega_{19}$ | 5 | 1 |
| 16 | 15 | $\omega_{20}$ | 18 | |
| 17 | 18 | $\omega_{21}$ | 6 | 1 |
| 18 | 1 | $\omega_{26}$ | 8 | |
| 19 | 8 | $\omega_{27}$ | 9 | |
| 20 | 9 | $\omega_1$ | 10 | |
| 21 | 10 | $\omega_{15}$ | 11 | |
| 22 | 11 | $\omega_2$ | 6 | 1 |
| 23 | 3 | $\omega_{10}$ | 12 | |
| 24 | 12 | $\omega_{11}$ | 13 | |
| 25 | 13 | $\omega_{12}$ | 14 | |
| 26 | 14 | $\omega_{13}$ | 5 | 1 |
| 27 | 2 | $\omega_{28}$ | 3 | |
| 28 | 12 | $\omega_{14}$ | 19 | |
| 29 | 19 | $\omega_{24}$ | 20 | |
| 30 | 20 | $\omega_{15}$ | 21 | |
| 31 | 21 | $\omega_{16}$ | 6 | 1 |

FIG. 7

| k \ q_s | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| 1 | 1 |   |   |   |   |   |   | 1 |   |   |   |   |   |   |   |   |   |   |   |   |   |   |   |   |
| 2 |   | 2 |   |   |   | 2 |   | 8 |   |   |   |   |   |   |   |   |   |   |   |   |   | 2 |   |   |
| 3 |   |   | 7 | 3 |   |   |   |   | 9 |   | 3 |   |   | 3 |   |   |   |   |   |   |   |   | 22 |   |
| 4 |   |   |   | 3 | 4 |   |   |   |   | 10 | 3 | 12 |   |   | 3 | 15 |   | 15 | 12 |   |   |   |   | 23 |
| 5 |   |   |   |   | 4 | 11 |   |   |   |   |   | 12 | 13 |   | 15 | 16 | 15 | 12 | 19 |   |   |   |   |   |
| 6 |   |   |   |   |   | 17 | 5 |   |   |   |   |   | 13 |   |   | 16 |   |   | 19 | 20 |   |   |   |   |
| 7 |   |   |   |   |   | 14 | $\frac{5}{21}$ |   |   |   |   |   |   |   |   |   |   |   |   | 20 |   |   |   |   |
| 8 |   |   |   |   |   | $\frac{5}{21}$ |   |   |   |   |   |   |   |   |   |   |   |   |   |   |   |   |   |   |

FIG. 8

| k \ q_s | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| 1 |   | $\omega_3$ |   |   |   |   |   | $\omega_{26}$ |   |   |   |   |   |   |   |   |   |   |   |   |   |   |   |   |
| 2 |   | $\frac{\omega_4}{\omega_{28}}$ |   |   |   | $\omega_5$ |   | $\omega_{27}$ |   |   |   |   |   |   |   |   |   |   |   |   |   | $\omega_{22}$ |   |   |
| 3 |   |   | $\omega_6$ | $\omega_7$ |   |   |   | $\omega_1$ |   | $\omega_{10}$ |   | $\omega_{12}$ |   |   |   |   |   |   |   |   |   |   | $\omega_{23}$ |   |
| 4 |   |   |   | $\omega_7$ | $\omega_8$ |   |   |   |   | $\omega_{15}$ | $\omega_{10}$ | $\omega_{11}$ |   | $\omega_{12}$ | $\omega_{17}$ |   | $\omega_{20}$ | $\omega_{14}$ |   |   |   |   |   | $\omega_{24}$ |
| 5 |   |   |   |   | $\omega_8$ | $\omega_2$ |   |   |   |   | $\omega_{11}$ | $\omega_{12}$ |   |   | $\omega_{17}$ | $\omega_{18}$ | $\omega_{20}$ | $\omega_{14}$ | $\omega_{24}$ |   |   |   |   |   |
| 6 |   |   |   |   | $\omega_{19}$ | $\omega_9$ |   |   |   |   |   |   | $\omega_{12}$ |   |   | $\omega_{18}$ |   |   | $\omega_{24}$ | $\omega_{15}$ |   |   |   |   |
| 7 |   |   |   |   | $\omega_{13}$ | $\frac{\omega_9}{\omega_{16}}$ |   |   |   |   |   |   |   |   |   |   |   |   |   | $\omega_{15}$ |   |   |   |   |
| 8 |   |   |   |   |   | $\frac{\omega_9}{\omega_{16}}$ |   |   |   |   |   |   |   |   |   |   |   |   |   |   |   |   |   |   |

SYNTACTIC CONTINUOUS SPEECH RECOGNIZER

BACKGROUND OF THE INVENTION

Our invention relates to pattern recognition arrangements and, more particularly, to automatic continuous speech recognition systems incorporating syntactic analysis.

In communication, data processing and control systems, it is often desirable to use speech as a direct input for inquiries, commands, data or other information. Speech input arrangements may be utilized to record information, to request information from processing equipment, or to control machine tools or other apparatus. Because of the variability of the speech signal from speaker to speaker and the variability for even a particular speaker, the degree of accuracy of speech recognition has been limited.

One type of priorly known speech recognition system receives an input speech signal and transforms the speech signal into a set of prescribed acoustic features. The set of features is compared to stored sets of previously obtained reference features for possible words to be recognized. When the prescribed features of the input speech signal correspond to a particular set of reference features in accordance with predetermined criteria, the word associated with the corresponding set of reference features is identified as the input speech signal. It is readily seen that the reliability of the recognition system is highly dependent on the selected features and on the prescribed recognition criteria. Where the reference features and the features of the input speech signal are obtained from the same speaker and the word to be recognized is spoken in isolation, the recognition system is relatively simple and its accuracy is improved.

The accuracy of recognition of a series of spoken words can be further improved by resorting to various non-acoustic sources of information such as syntax or semantics. The non-acoustic information sources are used to detect and correct errors in the acoustical recognition of single words on the basis of prescribed rules governing the relationship among the acoustically recognized words in the series. For example, a series of acoustically recognized words may be compared to each of a set of previously stored allowable sequences of reference words. In this manner, impermissible sequences can be discarded and permissible sequences similar to the combination of acoustically recognized words can be detected. Such an arrangement requires an exhaustive search of all syntactically or semantically allowable sequences. It is known, however, that even a limited series of words results in a large set of allowable sequences and that the number of allowable sequences increases exponentially with the number of words in the series. Therefore, an exhaustive search through the store of all allowable sequences of reference words to find the allowable sequence with the closest correspondence to the series of acoustically recognized words is impractical.

In U.S. Pat. No. 4,156,860 issued to S. E. Levinson May 29, 1979, and assigned to the same assignee a syntactic analyzer is described in which a series of spoken words is recognized as one of a plurality of predetermined sentences. A state sequence array defines the predetermined sentences in terms of state linked prescribed words. Each sentence corresponds to a selected plurality of state connected prescribed words ending in a final state. For each word position of the input series, a set of signals representative of the acoustic correspondence of the input series position word and the array prescribed words is generated.

A cumulative correspondence signal is produced for each sequence from the series position correspondence signals responsive to the state sequence array. Upon termination of the last word position of the input spoken word series, the sentence in its final state having the closest cumulative correspondence to the spoken word series is identified. This syntactic analyzer is adapted to recognize sentences or phrases when each word of the input series is spoken in isolation. There are many uses for speech recognizers, however, where the input utterances are not a series of isolated words but are continuous speech patterns with coarticulation. In such applications the utterance to be recognized must be segmented into separate words for syntactic analysis to be performed.

Prior art U.S. Pat. Nos. 3,816,722, 4,049,913 and 4,059,725, disclose arrangements for automatic recognition of continuous speech in which similarity measures between stored reference word patterns and patterns of an unknown utterance are calculated to select a reference pattern corresponding to the utterance. Both segmentation and word selection are made on the basis of the reference word pattern with the greatest similarity to the partial pattern for the input utterance. Arrangements based solely on similarity measures are useful in systems receiving spoken digit series where any order of digits is possible and there are no syntactic restraints.

It is often required, however, to recognize an utterance as one of a set of sentences which do have syntactic restrictions. In airlines reservation systems, for example, a typical request may be "What is the fare". The syntactic constraints, i.e., the arrangement of predetermined words in the sentence, inherent in this type of request can substantially aid in the recognition of an utterance. Prior art systems which segment and recognize solely on the basis of similarity are not adapted to utilize syntactic analysis in the choice of sentence corresponding to an input utterance. It is an object of the invention to provide improved recognition of continuous speech wherein syntactic arrangements are utilized.

SUMMARY OF THE INVENTION

As is well known in the art, syntax refers to the arrangement of word forms in a sentence. Where a series of spoken words is to be recognized as one of a plurality of syntactically restricted sequences, each recognition of a spoken word is limited by restrictive word arrangements. The recognition of one spoken word in the series limits further the possible choices for the succeeding spoken word to the word forms allowed by the predetermined sequences. Consequently, the syntax of the sequences avoids the necessity of comparing features of each successive spoken word to every possible reference word in a vocabulary. Further, the error in recognition of one or more spoken words in a series can be corrected on the basis of the syntactic restraints on the word series.

Continuous speech recognition arrangements, require segmentation of the continuous speech signal and acoustical recognition of the speech segments. Some systems have employed a predefined syntax structure to select a sequence from the already recognized segments. In the event that the initial segmentation is in error, later improvement of recognition accuracy by utilizing predetermined word form restrictions of syntactic analysis is rendered less effective. The theoretical aspects of use of syntax to recognize a continuous speech are described in the article "A New System For Continuous Speech Recognition—Preliminary Results," Levinson and A. E. Rabiner, appearing in *The Proceedings of ICASSP*-79 at pages 239–243, April 1979. The invention contemplates the utilization of a predefined syntactic structure, i.e., a set of signals defining the word arrangements of a plurality of predetermined sequences, to concurrently segment a continuous speech pattern and recognize the words of a speech pattern so that the most closely corresponding reference word sequence can be selected. Advantageously, the concurrent syntactically directed segmentation and recognition are adapted to enhance the accuracy and speed of recognition.

The invention is directed to a speech analysis arrangement adapted to recognize an utterance as one of a plurality of predetermined sequences of reference words in which a set of signals is generated to define the plurality of sequences and each sequence corresponds to a selected series of reference words. A signal identifies the successive word positions of the plurality of sequences. Jointly responsive to the sequence defining signals, the utterance and the reference words, a set of signals is produced each of which is representative of the correspondence between the utterance and one of the predetermined sequences. Responsive to the sequence correspondence signals, the sequence having the closest correspondence to the utterance is selected. The correspondence signal generation includes selecting a sequence reference word for the word position responsive to each sequence defining signal and selecting a portion of the utterance beginning at the endpoint of the preceding word position utterance portion for the sequence which corresponds to the sequence reference word responsive to the sequence defining signal. Signals representative of the endpoint of the current word position utterance portion for the sequence and a signal representative of the correspondence between the sequence word position reference word and the selected utterance portion are generated.

According to aspect of the invention, a signal representative of the range of endpoints of the utterance is generated. Responsive to the sequence defining signals in each identified word position, sequences which terminate in the identified word position are detected. Jointly responsive to the utterance endpoint range signal and the selected utterance portion endpoint signal for each terminating sequence in the identified word position, each terminating sequence having its selected utterance portion endpoint within the utterance endpoint range is identified as a candidate sequence for the utterance. The candidate sequence having the closest correspondence to the utterance is selected responsive to the correspondence signals of the candidate sequences of each identified word position.

According to yet another aspect of the invention, a signal is generated upon the occurrence of the final word position of the sequences and responsive to said final word position signal occurrence, the utterance is identified as the last selected candidate sequence.

In an embodiment illustrative of the invention, a set of first signals defining the syntactic arrangement of the plurality of predetermined reference word sequences is generated and stored. A set of signals representative of the acoustic features of the unknown utterance, including its endpoint range, is produced. A succession of second signals identifying the successive word positions of the plurality of sequences is also generated. A set of third signals each representative of the acoustic correspondence between the utterance and one of the reference word sequences is formed responsive to the set of first signals, the utterance feature signals and the reference word feature signals. The sequence having the closest correspondence to the utterance is selected responsive to said third signals.

To generate the third signals, a signal representative of the utterance portion endpoint for each sequence in the word position is stored. In each successive word position identified by the second signal, the current word position reference word feature signals for each sequence and the utterance portion for the present word position are selected responsive to the set of syntactic arrangement first signals and the signal representative of the utterance portion endpoint for the sequence in the preceding word position. Jointly responsive to the feature signals of the syntactically selected reference word and the feature signals of the utterance portion beginning at the stored endpoint of the sequence for the preceding word, a signal representative of the endpoint of the current word position utterance portion corresponding to the selected reference word is generated as well as a signal representative of the correspondence of the feature signals of the selected reference word and the feature signals of the utterance portion beginning at the stored endpoint of the preceding word position. Each sequence word correspondence signal is combined with the correspondence signals for the sequence of the preceding word positions to form a cumulative correspondence signal for said sequence.

Responsive to the utterance portion endpoint signals for each sequence and the utterance end range signal in each word position, sequences that terminate in the word position are detected. The terminating sequence having an utterance portion endpoint signal within the utterance end range having the closest correspondence to the utterance is stored as a candidate sequence for the utterance. Upon the termination of the last word position of the sequence, the utterance is identified as the last stored candidate word.

BRIEF DESCRIPTION OF THE DRAWING

FIG. 6 shows the arrangement of sequence defining signals in the sequence defining signal store of FIG. 4;

FIG. 7 shows the arrangement of the sequence state store of FIG. 4;

FIG. 8 shows the arrangement of the sequence word store of FIG. 4; and

DETAILED DESCRIPTION

Figure 1:
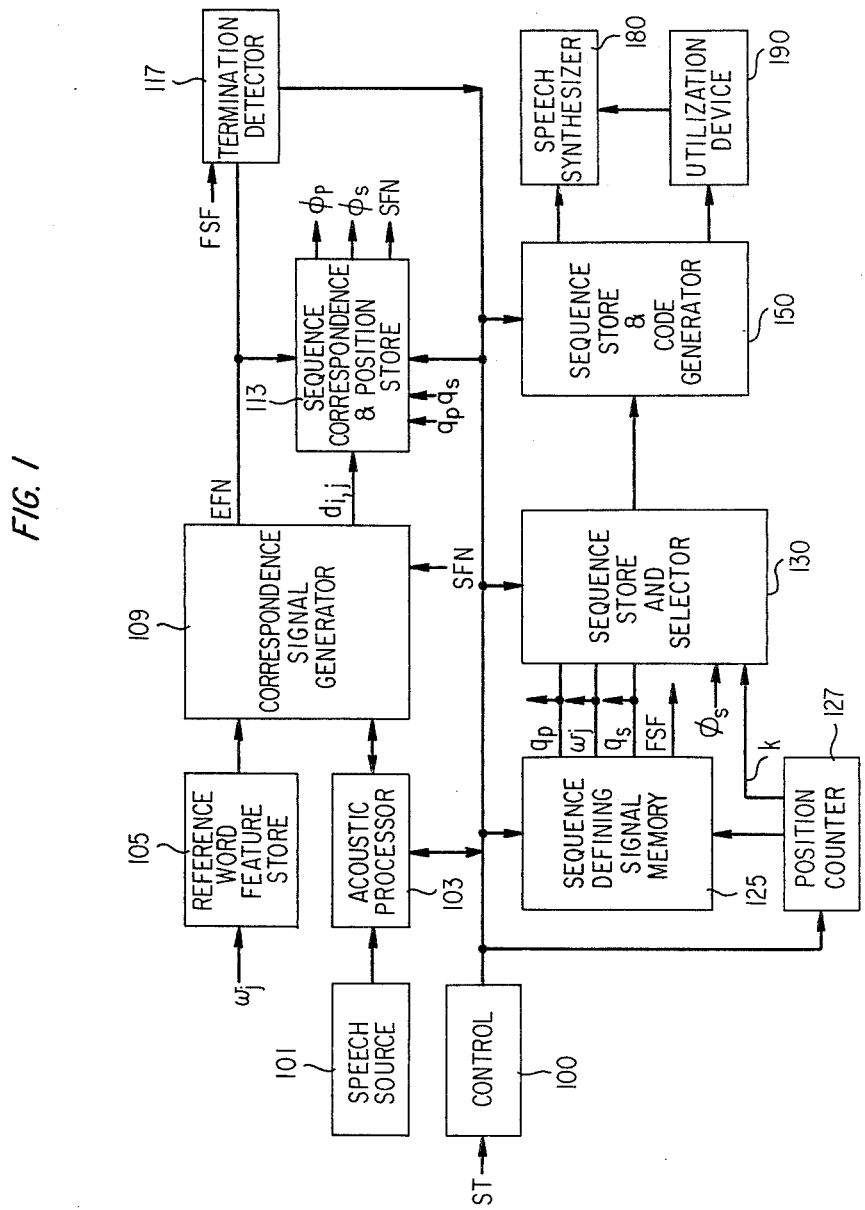
FIG. 1 depicts a general block diagram of a speech recognizer illustrative of the invention.

FIG. 1 shows a general block diagram of a syntactic speech recognizer illustrative of the invention in which a speech utterance signal U(t) is obtained from speech source 101. Signal U(t) is applied to acoustic processor 103 in which it is partitioned into time frames and analyzed. A set of acoustic feature signals is processed for each frame as is well known in the art. The sequence of feature signal sets are then stored in a frame addressable memory in processor 103. Reference word feature signal store 105 includes a set of acoustic feature signals of a representative utterance for each prescribed reference word of the recognizer. The reference word feature signals are permanently stored in store 105 which is addressed by reference word to access the feature signals of the successive frames of a selected reference word $w_j$.

Figure 5:
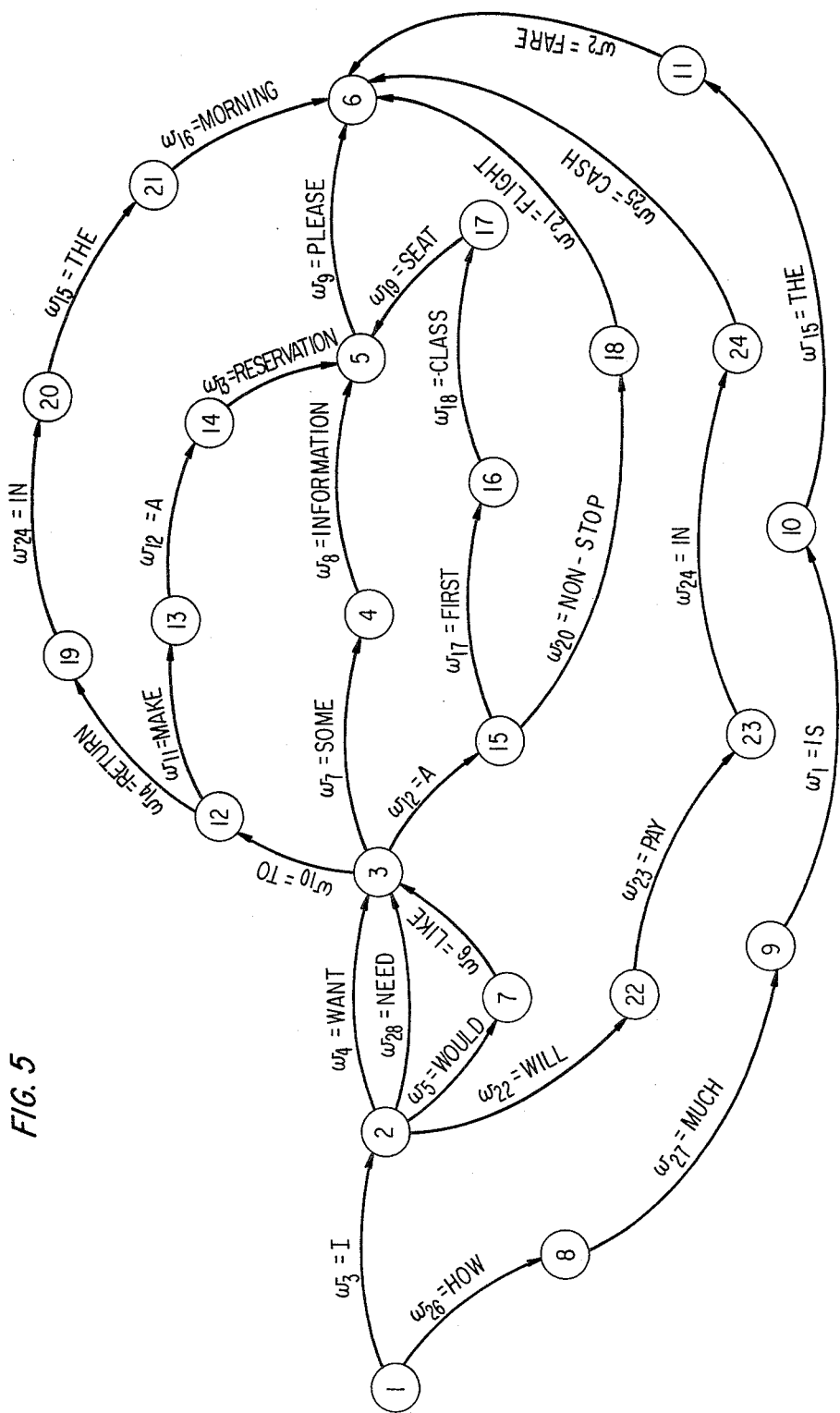
FIG. 5 illustrates a state sequence array defining the plurality of reference word sequences used in connection with the circuit of FIGS. 2, 3 and 4.

The syntactic structure used in the recognizer of FIG. 1 is stored as a plurality of sequence defining signals in memory 125. Each sequence defining signal includes a first coded state signal $q_p$, a reference word code $w_j$ and a second coded state signal $q_s$. The pair of state signals $q_p$, $q_s$ for each sequence defining signal determines the position of the reference word $w_j$ in the predetermined sequences of the system. FIG. 5 illustrates a state sequence array which is a partial set of reference word sequences useful in automated airline reservation systems. Each sequence is a series of reference words which words are connected by pre-assigned states. For example, The sequence "How Much Is the Fare" is made up of reference words $w_{26}$, $w_{27}$, $w_1$, $w_{15}$, and $w_2$. Reference word $w_{26}$ is preceded by state 1 which is the common starting state of all sequences of the system. Word $w_{26}$ is succeeded by state 8 which connects reference word 26 to reference word 27. The sequence "How Much Is The Fare" ends in state 6 after reference word $w_2$. State 6 identifies the sequence end point and as such is called a final state. Thus, the predetermined sequence "How Much Is The Fare" corresponds to 1-$w_{26}$-8-$w_{27}$-9-$w_1$-10-$w_{15}$-11-$w_2$-6 in FIG. 5.

Memory 125 is arranged to store the sequence defining signals as shown in FIG. 6. Each sequence defining signal in FIG. 6 is accessed as addressed by the list number L of column 1 which number is obtained from position counter 127. For each word position of counter 127, the sequence defining signals are obtained in listed order shown in FIG. 6 under control of the counter. In this way, all possible sequence reference words of the state sequence array of FIG. 5 are made available in each word position.

Each sequence defining signal includes a preceding state $q_p$, a reference word $w_j$, a succeeding state $q_s$ and a code to indicate whether the $q_s$ state is a final state. For example, the first sequence defining signal is 1,$w_3$,2,0. $q_p=1$ specifies the state preceding the reference word $w_3$, $q_s=2$ specifies the state succeeding reference word $w_3$ and the next column signal, FSF=0, indicates that state 2 is not a final state. This sequence defining signal corresponds to the word "I" between states 1 and 2 in FIG. 5. Feature signals for the word "I" are stored in reference word feature signal store 105 in the locations identified by code $w_3$. As is readily seen from FIGS. 5 and 6, memory 125 includes the elements for all the possible sequences shown in FIG. 5.

The recognition of the utterance as one of the reference word sequences requires segmentation of the utterance into words and a determination of the sequence with the closest acoustic correspondence to the segmented utterance. In accordance with the invention, both the utterance segmentation and the correspondence evaluation are performed in response to the syntactic restrictions of the state sequence array illustrated in FIG. 5 and embodied in the sequence defining signals stored in memory 125. The correspondence evaluation is performed for each word position in correspondence signal generator 109 responsive to the feature signals of syntactically selected reference words from store 105 and the feature signals of a syntactically determined segment of the utterance from acoustic processor 103. The correspondence signals for the sequences are accumulated in sequence correspondence and position store 113 which is also operative to store the boundary frame of the utterance in each word position of a sequence.

In the arrangement of FIG. 1, the utterance feature signals stored in processor 103 and the reference word feature signals of store 105 are linear prediction coefficient (LPC) signals well known in the art. When a sequence defining signal appears at the output of memory 125, the sequence word code thereof ($w_j$) is applied to store 105 so that the $w_j$ feature signals can be accessed. The $q_p$ state signal from memory 125 is applied to correspondence signal and position store 113. In this manner, the starting frame position signal SFN corresponding to sequence defining $q_p$ state is supplied from store 113 to processor 103 via generator 109 and the beginning utterance frame for the sequence word position is addressed. The successive frame feature signals from reference word feature signal store 105 are applied to one input of correspondence signal generator 109 while the successive frame feature signals of the word position utterance portion starting at frame SFN are supplied to the other input of generator 109 from the output of processor 103.

Generator 109 includes apparatus adapted to time align the utterance feature signals from processor 103 with the reference word $w_j$ feature signals from store 105 in accordance with the arrangements described in the article "Considerations in Dynamic Time Warping Algorithm for Discrete Word Recognition", *IEEE Transactions ASSP*, volume ASSP-26, No. 6, pages 575–582 by L. R. Rabiner, A. E. Rosenberg and S. E. Levinson. As a result of the time alignment in which the best match between utterance and reference word frames is determined, an ending frame EFN signal for the utterance portion is generated as well as a distance signal $d_{ij}$ representative of the correspondence between the selected utterance portion and reference word $w_j$. The distant signal $d_{ij}$ is added to the cumulative correspondence signal of the sequence for the preceding word position ($\Phi_p$) and the sum $$\Phi_s = \Phi_p + d_{ij} \qquad (1)$$

is placed in the $q_s$ position of store 113. The end frame of the utterance portion for the sequence is also stored in the $q_s$ position of store 113. In this manner, the starting frame SFN for the sequence utterance portion of the next word position is available as well as the cumulative correspondence signal for the present word position of sequence.

Initially, store 113 is preset so that the stored cumulative correspondence signal $\Phi_p$ for the $q_p=1$ starting state is zero and the cumulative correspondence signal $\Phi_p$ for all other states is $\infty$. Similarly, the starting position codes SFN in store 113 are arranged so that the code in the $q_p=1$ starting state is one and the SFN codes in all other positions are zero. Sequence selector 130 and sequence store 150 are erased so that no selected sequence is stored therein and position counter 127 is reset to the first word position preparatory to the syntactic analysis of the utterance feature signal sequence.

In each word position determined by counter 127, sequence selector 130 stores the states and the reference word codes of the word position for every sequence having a correspondence signal in sequence correspondence and position store 113. The storage arrangement of sequence selector 130 permits the reconstruction of any sequence selected as a candidate for the utterance from the sequence final state. The sequence storage in selector 130 conforms to the state sequence array illustrated in FIG. 5, and is addressed by word position.

The only sequences that could be identified as the utterance stored in processor 103 are those in their final or terminating states which have end points within a predetermined range of time frames of the utterance end point frame. When such a candidate sequence is detected by termination detector 117, the closest corresponding candidate sequence is selected by sequence selector 130 and is stored in sequence store 150. In the circuit of FIG. 1 the closest corresponding candidate sequence is the terminal sequence having the minimum average word cumulative correspondence signal.

Upon detection of a word position wherein all sequence end point frames generated for the word position are beyond the final possible utterance end point frame, the candidate sequence last placed in store 150 is identified as the utterance. The identification is also initiated after detection of the last possible word position of the sequences or detection of a word position in which there is no valid utterance portion. Responsive to the identified sequence, a coded signal is made available from store 150. The coded signal is supplied to speech synthesizer 180 which, as is well known in the art is adapted to provide a spoken version of the identified sequence for verification purposes. The coded signal from store 150 is made available to utilization device 190 which may comprise a processing arrangement adapted to provide a desired response signal to the inquirer via speech synthesizer 180.

Figure 2:
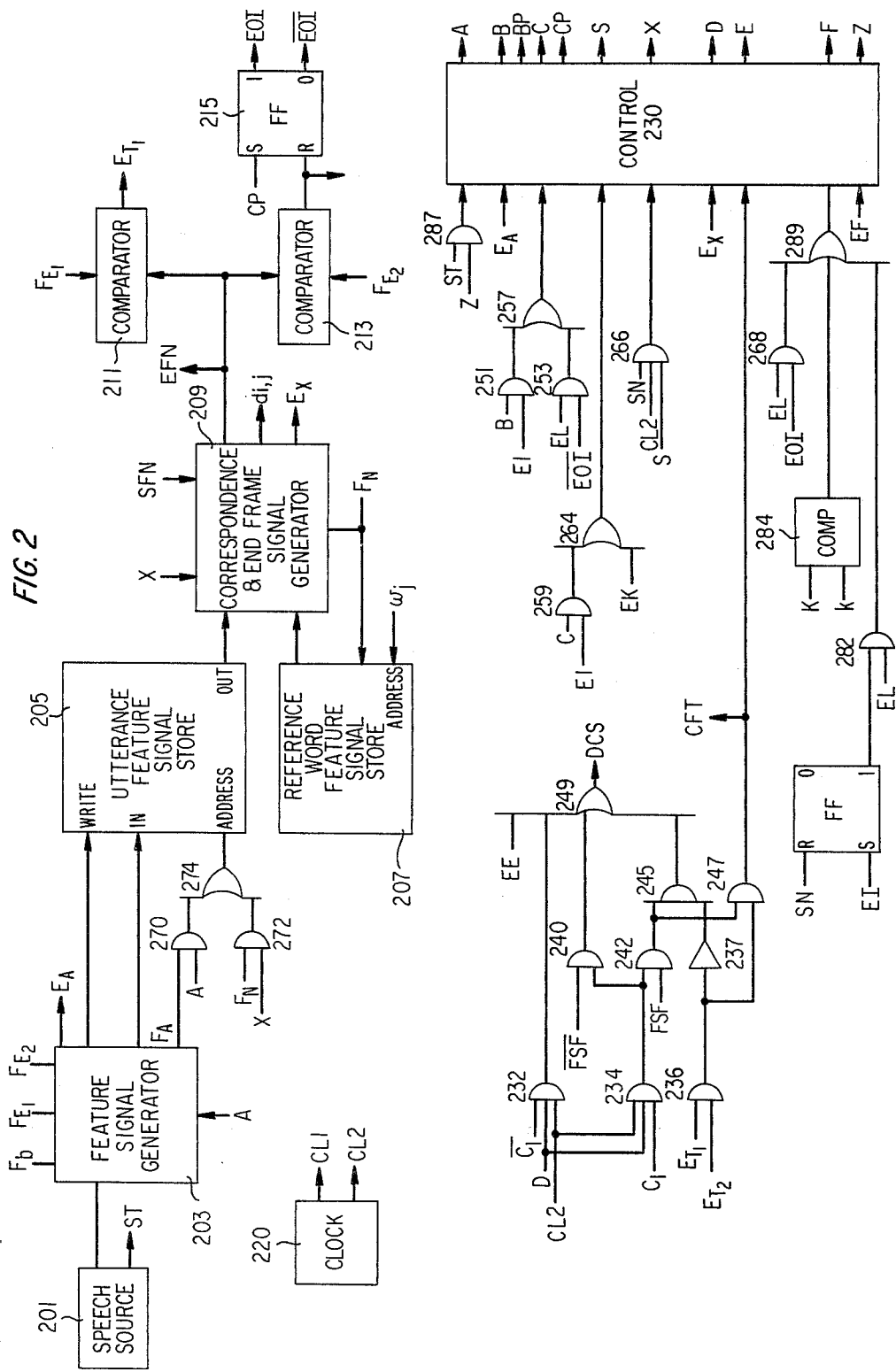
FIGS. 2, 3 and 4 depict a detailed block diagram of a syntactic continuous speech recognizer illustrative of the invention.
Figure 3:
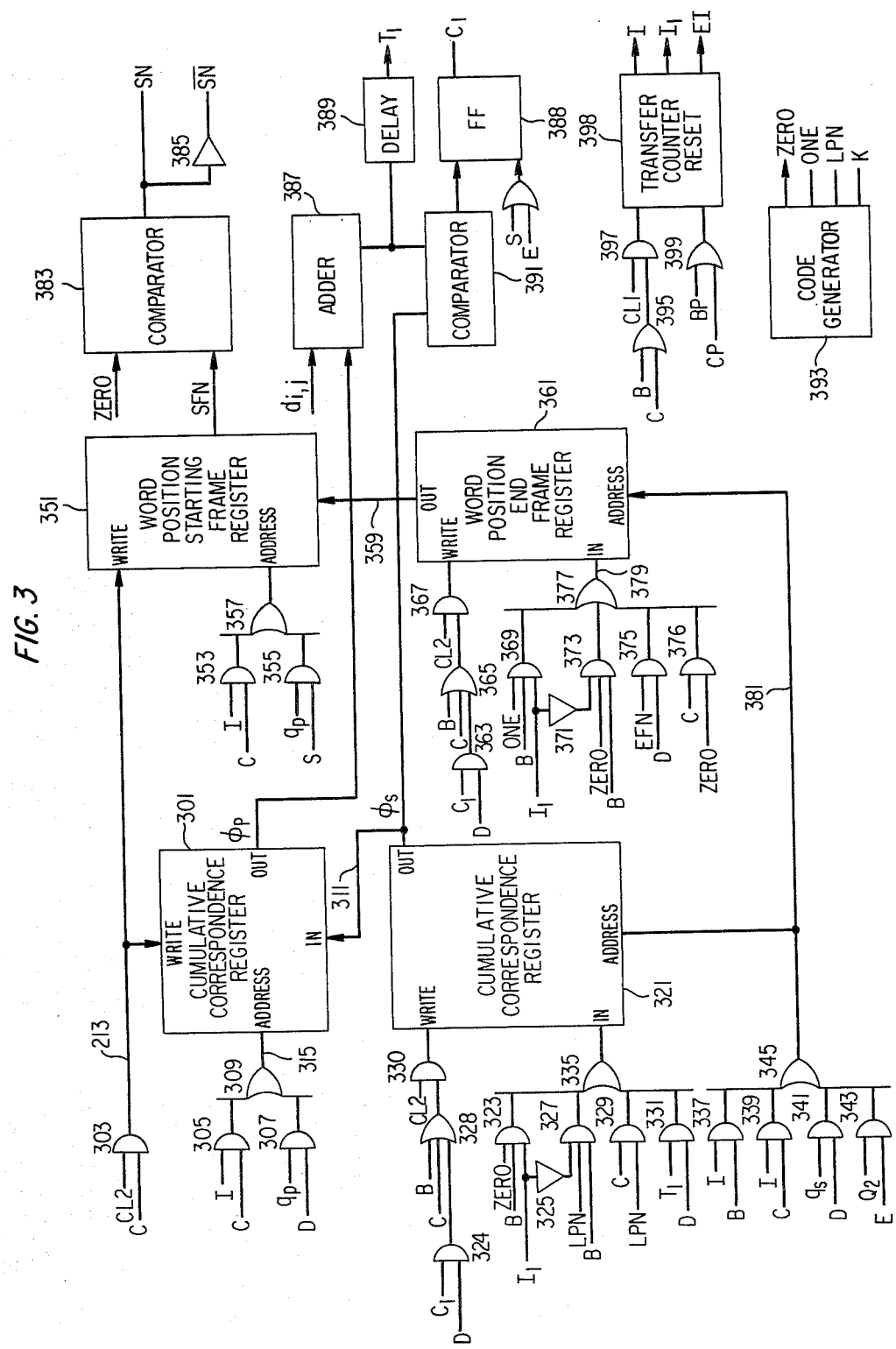
Figure 4:
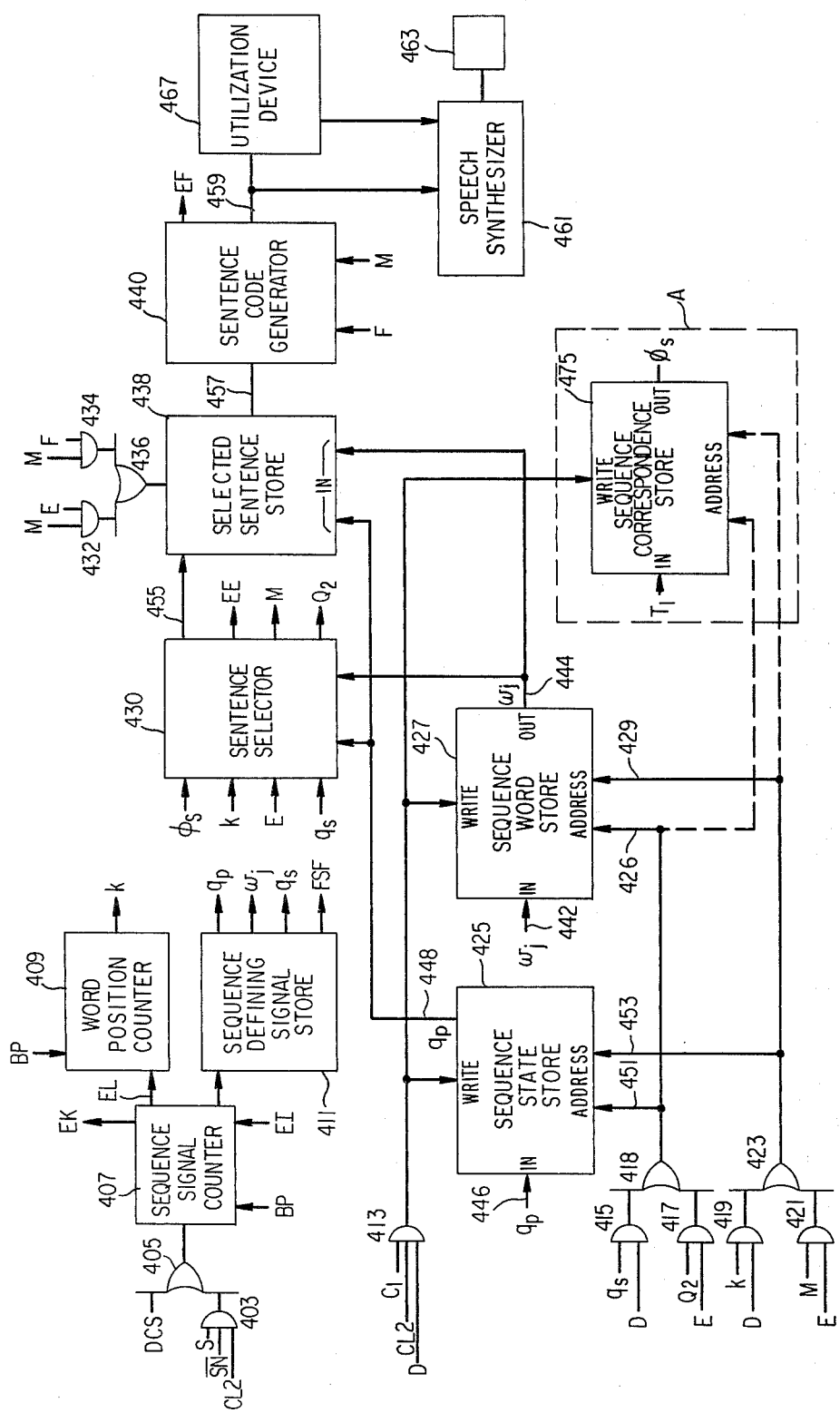

The syntactically controlled continuous speech recognizer of FIG. 1 is shown in greater detail in FIGS. 2, 3 and 4. Referring to FIG. 2, a control pulse ST is applied to control 230 from speech source 201 via AND-gate 287 when a speech signal U(t) is to be applied to feature signal generator 203 and no other utterance is being analyzed. Control 230 may be an array of logic circuits well known in the art adapted to provide a sequence of control pulses responsive to logic input pulses. The channel selection apparatus described on page 48 of Vol. 13 of 400 Ideas For Design by Hayden Book Company, Rochelle Park, N.J., copyright 1976 may be readily adapted for use as controller 230 where momentary switches are replaced by the inputs to control 230. An input signal, e.g., a pulse from gate 266 is applied to the channel selection apparatus, enables only output signal X and disables the previously enabled output, e.g., D. Alternatively, a control of the type depicted in U.S. Pat. No. 4,156,868 issued May 29, 1979 may be utilized. Signal U(t) may, for example, correspond to the utterance "I Would Like Some Information Please." In response to signal ST, control 230 generates control signal A to initiate the utterance processing mode of the recognizer circuit. Signal A is applied to feature signal generator 203 which is operative responsive thereto to partition the signal U(t) into successive 10 millisecond time frames. A set of linear prediction coefficient (LPC) feature signals is produced for each frame $F_n$ of signal U(t) as is well known in the art. The linear prediction coefficient generation arrangement disclosed in U.S. Pat. No. 4,092,493 issued May 30, 1978 to L. R. Rabiner and M. R. Sambur is suitable.

The feature signals from generator 203 are supplied to input feature signal store 205 which may be an array of type SN 74S214 TTL memories. A frame address signal $F_A$ from generator 203 is supplied to the address input of store 205 via AND-gate 270 and OR-gate 274. A write signal is supplied from generator 203 to store 205 with each succeeding feature signal so that the feature signals from generator 203 are placed in store 205 as addressed by the successive time frames $F_A$.

In addition to providing the feature signals for the utterance, generator 203 also stores the starting frame $F_s$ for the utterance as well as two frames $F_{E1} < F_{E2}$ defining the range of utterance end point frames. After the utterance feature signals are stored in store 205, an $E_A$ signal is supplied from generator 203 to control 230. The $E_A$ signal causes the circuit of FIGS. 2, 3 and 4 to switch from its utterance processing mode to its initial conditioning mode.

During the initial conditioning mode, the circuit of FIGS. 2, 3 and 4 is placed in a state which permits syntactic analysis of the utterance beginning with the first word position of the sequences from the starting state $q_p = 1$ shown in the state sequence array of FIG. 5. Sequence counter 407 and word position counter 409 of FIG. 4 are reset to their first states. Sequence counter 407 as well as counter 398 may each comprise a type 74293 counter and a type 7485 comparator. Word position counter 409 may be a type 74293 counter. Cumulative correspondence register 321 of FIG. 3 is initialized so that a zero signal is placed in its $q_s = 1$ position (starting state) and a largest possible number code (LPN) corresponding to ∞ is placed in each other state position thereof. Register 321 as well as each of registers 301, 351 and 361 may be a type 74S214 store. The candidate sequence correspondence signal in selector 430 is also set to an LPN code. Word position and frame register 361 is initialized so that its $q_s = 1$ state position is set to the value one corresponding to the first utterance frame $F_s$. Every other $q_s$ position of register 361 is set to zero to indicate that none of these state positions initiate the sequences of FIG. 5 in the first word position.

Figure 9:
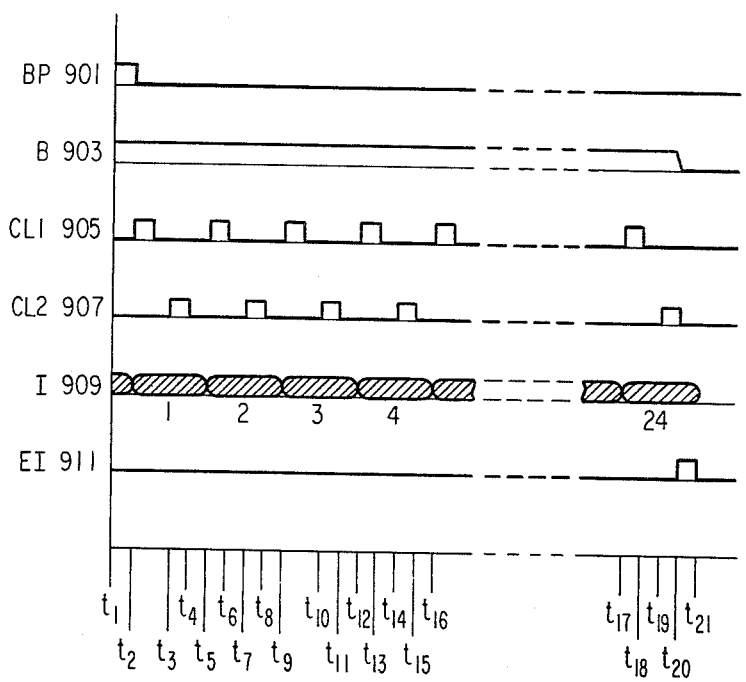
FIGS. 9, 10 and 11 show waveforms illustrating the operation of the circuit of FIGS. 2, 3 and 4.

Responsive to pulse $E_A$ occurring at the termination of the utterance processing mode, control 230 generates control signal B and the initial conditioning mode is started. The waveforms of the initial conditioning mode are shown in FIG. 9. At time $t_1$ in FIG. 9, signal B (waveform 903) becomes enabling and a short pulse BP (waveform 901) is generated in control 230. Control pulse BP from control 230 is applied via OR-gate 399 to transfer counter 398 of FIG. 3. Pulse BP resets counter 398 to its zero state at the beginning of the initial conditioning mode. Pulse BP is also applied to the reset inputs of sequence signal counter 407 and word position counter 409 to reset these counters to their first states. Counter 407 is used to address sequence defining signals in store 411 while counter 409 defines the word positions of the sequences which sequences are assembled in accordance with the state sequence array of FIG. 5. Store 411 may be the type 74S472 PROM store.

Each of cumulative correspondence registers 301 and 321 as well as word position starting frame and ending frame registers 351 and 361 in FIG. 3 includes 24 storage positions. These storage positions correspond to the 24 circled state numbers shown in the state sequence array of FIG. 5. When signal B is in its enabled condition, cumulative correspondence register 321 and word position end frame register 361 are addressed by signal I from counter 398 via AND-gate 337 and OR-gate 345. Clock circuit 220 of FIG. 2, which may comprise the type 74LS362 clock oscillator and pulse forming circuits well known in the art provides clock pulses CL1 shown in waveform 905 and clock pulses CL2 shown in waveform 907. AND-gate 397 (FIG. 3) is responsive to clock pulse CL1 and control signal B from control 230 to increment counter 398 to its first state. Counter 398 successively counts from one to twenty-four and provides a sequence of twenty-four I address codes to AND-gate 337 whereby the twenty-four state positions of registers 321 and 361 are successively addressed while control signal B is enabling.

The timing of the I address codes from counter 398 while signal B is enabled is illustrated in waveform 909. As indicated in waveform 909, the I code from counter 398 is 1 between times $t_2$ and $t_6$, 2 between times $t_6$ and $t_9$, 3 between times $t_9$ and $t_{13}$, 4 between times $t_{13}$ and $t_{16}$, and 24 between times $t_{17}$ and $t_{21}$. The I address code representative waveform which occur between codes 4 and 24 are omitted in waveform 909.

At time $t_2$ and $I=1$ code from counter 398 is applied to the address inputs of cumulative correspondence register 321 and word position end frame register 361 via AND-gate 337 and OR-gate 345. The first state positions $q_s=1$ of these registers is addressed. In the time period between $t_2$ and $t_6$, the $I_1$ signal from counter 398 enables gates 323 and 369. The zero code from code generator 393 is supplied via AND-gate 323 and OR-gate 335 to the input of register 321 and the $F_s=1$ starting frame of the utterance is supplied to the input of end frame register 361 via AND-gate 369 and OR-gate 377. The zero code is inserted into position 1 of register 321 between times $t_4$ and $t_5$ during which the CL2 clock pulse is applied to the write input of register 321 via gate 330. In like manner, the starting frame code is inserted into position 1 of end point register 361 between times $t_4$ and $t_5$ responsive to the CL2 clock pulse supplied to the write input of register 361 via gate 367. Responsive to the CL1 clock pulse, beginning at $t_6$, counter 398 is incremented and the second positions of registers 321 and 361 are addressed via gates 337 and 345. Upon termination of the first state of counter 398, signal $I_1$ is modified so that gates 323 and 369 are disabled.

For the remainder of the count of transfer counter 398, AND-gate 327 is enabled by the output of inverter 325 and the B signal from control 230. AND-gate 373 is also enabled by the output of inverter 371 and signal B. The LPN code from generator 393 is applied to the input of register 321 via gates 327 and 335 while the zero code from generator 393 is supplied to the input of register 361 via gates 373 and 377. When the second positions of registers 321 and 361 are addressed, an LPN code is inserted into the second position ($q_s=2$) of register 321, and a zero code is inserted into the second position of end frame register 361 responsive to the CL2 clock pulse (waveform 907) between times $t_7$ and $t_8$. In similar manner, the succeeding positions of register 321 are successively addressed by counter 398 and a LPN code is inserted into each of the positions. The succeeding positions of register 361 are also addressed by counter 398 and a zero code is inserted in each of these positions. At time $t_{20}$ in the twenty-fourth I address state of counter 398, ending pulse EI (waveorm 911) is generated in counter 398 by means of a comparison arrangement well known in the art. The EI pulse is applied to control 230 via AND-gate 251 and OR-gate 257 in FIG. 2. Control 230 is responsive tto the EI pulse at this time to disable control signal B and to produce control pulse CP and control signal C shown in waveform 1001 and 1003 of FIG. 10.

Responsive to control pulse CP, counter 398 in FIG. 3 is reset to its zero state. The I output of counter 398 is applied to the address inputs of registers 321 and 361 via AND-gate 339 and OR-gate 345. Additionally, the I output of counter 398 is supplied to the address input of cumulative correspondence register 301 via AND-gate 305 and OR-gate 309, and to the address input of word position starting frame register 351 via AND-gate 353 and OR-gate 357. The successive I states of counter 398, states 1, 2, 3, 4 and 24, occurring when signal C is enabling are shown in waveform 1009. The I address outputs which occur between states 4 and 24 are omitted in FIG. 10 for purposes of simplification.

When counter 398 is in its first state between times $t_2$ and $t_6$ (FIG. 10) the LPN code from code generator 393 is applied to the input of register 321 via AND-gate 329 and OR-gate 335. Responsive to the CL1 clock pulse (waveform 1005) occurring between times $t_2$ and $t_3$, the zero code in the first position of register 321 is read out therefrom and applied to the input of register 301 via line 311. In the same time interval, the one code in the first position of register 361 is applied to the input of register 351. Between times $t_4$ and $t_5$ the CL2 clock pulse (waveform 1007) is supplied to the write inputs of registers 301 and 351 via AND-gate 303. The zero code from the first position of register 321 is thereby inserted into the first position of register 301. The LPN code at the input of register 321 is inserted into the first position of register 321. Concurrently, the one code in the first position of registev 361 is inserted into the first position of register 351 and a zero code is put into the first position of register 361.

Figure 10:
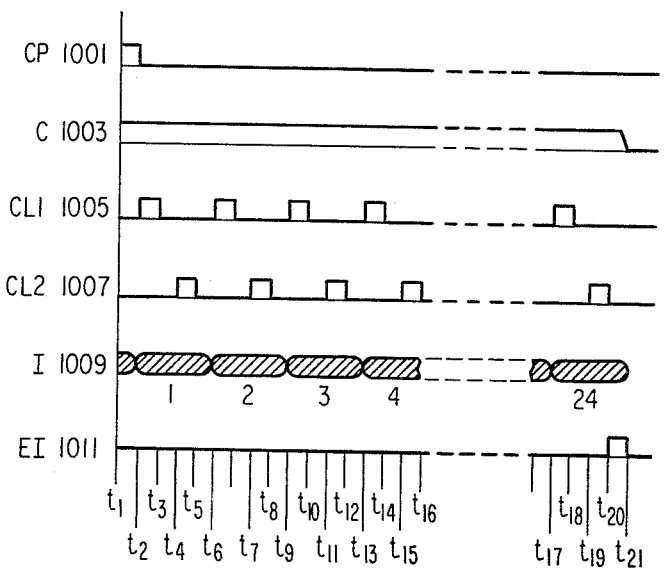

In the subsequent time periods defined by the I output codes of counter 398, the LPN codes in register 321 are successively transferred to the corresponding positions of register 301 and the zero codes in register 361 are successively transferred to the corresponding positions of register 351. The LPN codes from code generator 393 are inserted into the successive positions of register 321 and the zero codes from generator 393 are inserted into the successive positions of register 361 in the same time interval. At time $t_{20}$, counter 398 is in its twenty-fourth state and ending pulse EI (waveform 1011) is generated in counter 398. The EI pulse is applied to control 230 in FIG. 2 via AND-gate 259 and OR-gate 264. The EI pulse causes control 230 to disable signal C and to enable control signal S by time $t_{21}$ (FIG. 10). At the end of the initialization mode for the first word position, cumulative correspondence register 301 contains a zero in its $q_p=1$ state position and LPN codes in the remaining twenty-three state positions. Cumulative correspondence register 321 contains LPN codes in all twenty-four state positions. Word position starting frame register 351 contains a one code in its first position and zero codes in the remaining 23 state positions and end frame register 361 contains a zero code in each of its 24 positions.

In the scan mode initiated by control signal S, word position starting frame register 351 is addressed by the $q_p$ output of sequence defining signal store 411 to detect the sequences for the first word position thereof. Each position of register 351 contains a code corresponding to the starting frame of the utterance in the word position defined by word position counter 409. A zero code in the addressed position of register 351 signifies that the addressed $q_p$ position is not part of a sequence of FIG. 5 in the present word position. The starting frame code SFN from register 351 is applied to one input of comparator 383 wherein it is compared to a zero code from code generator 393. A non-zero SFN code causes comparator 383 to provide an enabling SN output from which a disabling $\overline{SN}$ is derived. The enabled SN signal interrupts the scan mode and initiates a sequence evaluation mode in which an utterance portion corresponding to the word position reference word $w_j$ of the sequence defined by the output of store 411 is selected and a signal representative of the correspondence between the selected utterance portion and the sequence word $w_j$ from store 411 is generated. The $\overline{SN}$ resulting from an SFN=0 output from register 351 increments sequence signal counter 407 so that the next sequence defining signal in store 411 is addressed.

Figure 11:
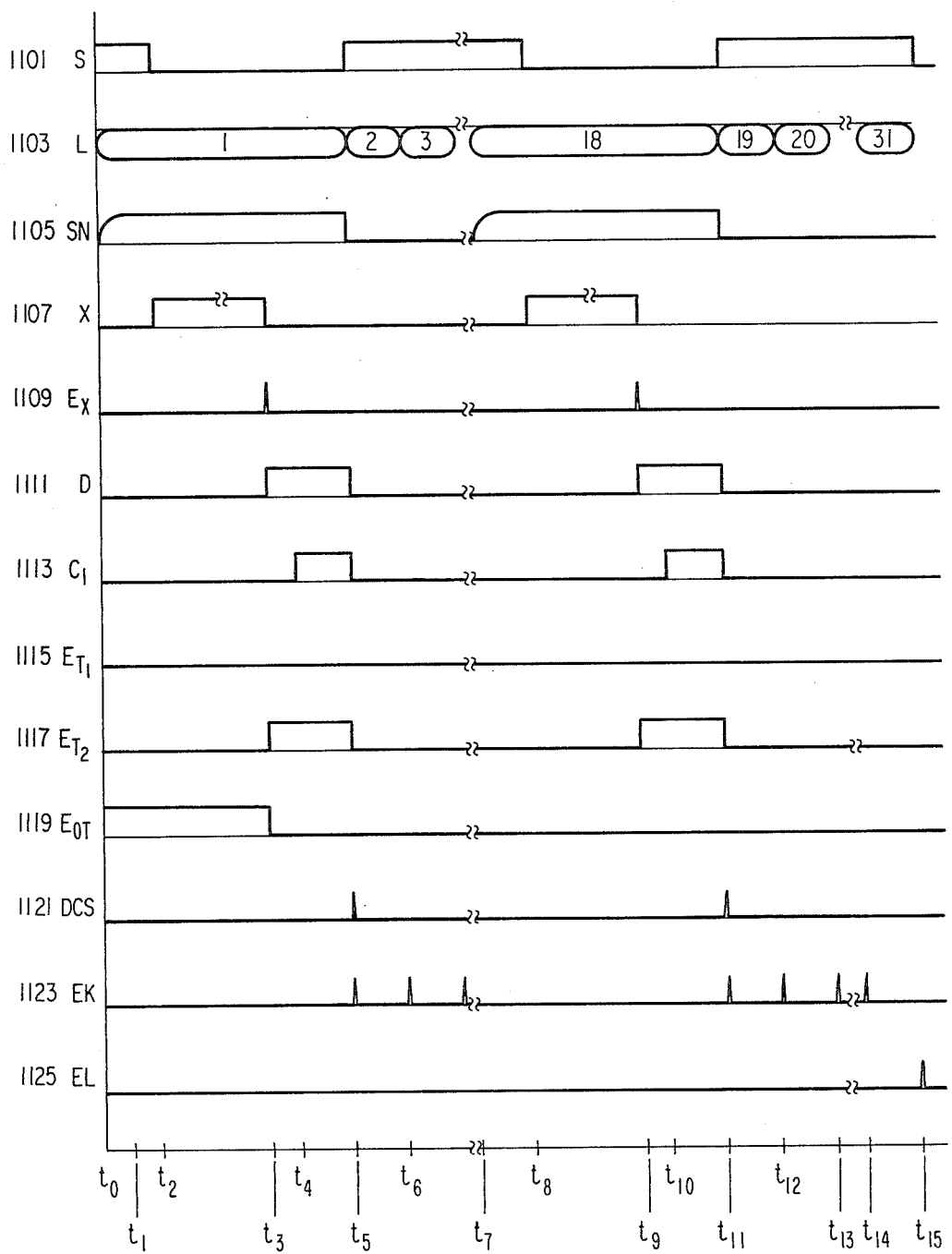

At the beginning of the scan mode for the first word position (k=1), control signal S is enabled at time $t_0$ in FIG. 11 (waveform 1101) and sequence signal counter 407 addresses the L=1 position of sequence defining signal store 411 as illustrated in waveform 1103. The $q_p$ output from store 411 is 1 so that the $q_p=1$ state position of word position starting frame register 351 is addressed via AND-gate 355 and OR-gate 357. An SFN=1 code output is obtained from register 351 whereby comparator 383 switches to its enabled SN state during the current CL1 clock pulse at $t_1$ (waveform 1105). AND-gate 266 is enabled by the S control signal and the SN signal from comparator 383 during the succeeding CL2 clock pulse. Responsive to enabled gate 266, control 230 is operative at $t_2$ in FIG. 11 to disable the S control signal (waveform 1101) and to enable the X control signal (waveform 1107). The scan mode in the first word position is interrupted upon the detection of sequence defining signal $q_p=1$, $w_3=I$, $q_s=2$, FSF=0 coded signal for which there is non-zero starting frame number in register 351. In the sequence evaluation mode defined by enabled control signal X, the utterance portion corresponding to the $w_3=I$ reference word is selected in input feature signal store 205 and a correspondence signal, $d_{13}$, representative of the similarity between the selected utterance portion for $w_3=I$ and the reference word feature signals for the $w_3=I$ word is produced in generator 209.

Responsive to control signal X, the starting frame code SFN=1 from starting frame register 351 is inserted into generator 209. A sequence of frame addresses FN for the utterance portion is produced in generator 209 and supplied to reference word feature signal store 207 and to AND-gate 272. The $w_3$ signal addresses the reference word feature signals for "I" in store 207 and the successive frames thereof are addressed by signal FN. Concurrently, the FN frame signals are applied to the address input of input feature signal store 205 via AND-gate 272 and OR-gate 274. In this manner the portion of the utterance beginning at the starting frame number SFN=1 is supplied to correspondence and end frame signal generator 209.

As described in the aforementioned article by Rabiner, Rosenberg, and Levinson, correspondence and end frame signal generator 209 is operative to time align the frames of the utterance feature signals from input feature signal store 205 with the frames of the reference word feature signals from reference word feature signal store 207 whereby a best match between the utterance portion and reference word is determined. Responsive to the feature signals of the matched frames, signal $d_{13}$ is generated which is representative of the LPC distance between the utterance portion and the reference word feature signals. Additionally, the end frame of the reference word is transposed into the time aligned utterance portion frame to produce an EFN signal which corresponds to the end frame of the selected utterance portion and also to the beginning frame of the next word position of the utterance for this sequence.

Correspondence and end frame signal generator 209 may comprise data processing apparatus such as the Data General Corporation micro NOVA Computer or other microprocessor arrangements well known in the art adapted to perform the time alignment, distance signal generation, and end frame determination. Correspondence and end frame signal generator 209 includes a read only memory in which is permanently stored the sequence of instruction codes required for processing the feature signals from stores 205 and 207 to obtain the distance signal $d_{ij}$ and the end frame signal EFN for the utterance in the word position of the sequence.

The micro NOVA Computer system is described in the book, *Microproducts Hardware Systems Reference* by Data General Corp., Westboro, Mass., copyrighted 1979.

As set forth in Appendix A, processor 209 waits for control signal X to be enabled in control 230. Upon receipt of enabled signal X, signal SFN from word position starting frame register 351 is accepted by the processor. The processor is conditioned to generate and output a set of 75 $F_N$ frame codes which are supplied therefrom to reference word feature signal store 207. The reference word feature signals for the $F_N$ frames of the reference word addressed by signal $w_j$ from sequence defining signal store 411 are supplied to an input of correspondence endframe generator 209. In this manner, processor 209 gets the reference feature signals. The processor also gets feature signals from the input utterance feature signal store beginning at frame SFN and starts the dynamic time warping of the reference word feature signals to the utterance feature signals from the SFN frame. The successive frame feature signals of the utterance are read by processor 209 from store 205 as addressed by $F_N$ frame codes via gates 272 and 274.

The $d_{ij}$ and EFN signals are concurrently produced in processor 209 on the basis of the well-known Itakura minimum prediction residual which provides a frame-by-frame correspondence signal $$d_F = -\log aVa^T/\hat{a}V\hat{a}^T$$

where a and â represent the linear prediction coefficients of the utterance and reference, respectively. The signals $d_{ij}$ and the time warped endframe EFN of the utterance segment beginning at SFN are generated as shown in detail in Appendix A in accordance with the aforementioned Rabiner et al. reference.

The stored instructions are listed in Fortran language form in Appendix A.

Upon determination of distance signal $d_{13}$ and end frame signal EFN at time $t_3$ in FIG. 11, generator 209 supplies a EX pulse (waveform 1109) to control 230. The EX pulse disables signal X and enables control signal D (waveform 1111). In this manner, the sequence evaluation mode for the sequence defining signal is terminated and the sequence storage mode is started. During the sequence storage mode between time $t_3$ and $t_5$, the $q_p$ and $w_j$ codes are inserted into stores 425 and 427, respectively, as addressed by the $q_s$ code from sequence defining signal store 411 and the word position code (k) from word position counter 409. Each of stores 425 and 427 may comprise an array of type 74S214 RAM memories. The cumulative correspondence signal for the present word position of the sequence is produced by combining the preceding word position cumulative correspondence signal $\Phi_p$ from register 301 with the distance signal $d_{ij}$ from correspondence signal generator 209. The EFN signal is also stored in word position end frame register 361.

Cumulative correspondence register 301 is addressed by the $q_p=1$ code from sequence defining signal store 411 via AND-gate 307 and OR-gate 309. The zero code from this position of register 301 is applied to one input of adder 387 in which the sum $$\Phi_2 = \Phi_1 + d_{13} \qquad (2)$$

is formed. The output of adder of 387 is applied to one input of comparator 391. Adder 387 may comprise the type 74283 adder circuit. The other input to comparator 391 (e.g. type 74283) is obtained from the second position of register 321 which is addressed by the $q_s=2$ code from sequence defining signal store 411 in FIG. 4. The resulting sum from adder 387 is, for example, 0.392. Since the resulting sum is less than the LPN code from register 321, the output of comparator 391 becomes enabling and flip-flop 388 is set to provide an enabling $C_1$ signal at time $t_4$ in FIG. 11. Enabled signal $C_1$ (waveform 1113) is applied to the write input of register 321 via AND-gate 324, OR-gate 328 and AND-gate 330. A delayed sum code output from adder 387 is supplied via delay 389 to the input of gate 331 and is transferred therefrom via gates 331 and 335 to the input of cumulative correspondence register 321. Delay 389 may be the Edison Electronics DL-9000 series D&P Delay line. Responsive to the write signal from gate 330, the resulting sum is inserted into position 2 of register 321 as addressed by the $q_s=2$ code from store 411.

The $q_s=2$ code also addresses word position end frame store 361 via AND-gate 341 and OR-gate 345. The EFN signal from generator 209 is supplied to the input of end frame register 361 via gates 375 and 377. Responsive to the $C_1$ output from flip-flop 388, the write input of register 361 is enabled via gates 363, 365 and 367, so that the EFN code is inserted into the $q_s=2$ position of end frame register 361.

Both sequence state store 425 and sequence word store 427 in FIG. 4 are addressed by the $q_s=2$ code from store 411 via AND-gate 415 and OR-gate 418. These stores are further addressed by the $k=1$ signal from word position counter 409 via AND-gate 417 and OR-gate 423. The $q_p=1$ code from store 411 is thereby inserted into the $q_s=2$, $k=1$ position of sequence state store 425 while the $w_3$ code is inserted into the $q_s=2$, $k=1$ position of store 427 responsive to the $C_1$ signal applied to AND-gate 413. FIG. 7 shows the arrangement of store 425 and FIG. 8 shows the arrangement of store 427. At this time a $q_p=1$ code is in position $q_s=2$, of FIG. 7 and a $w_3$ code in the corresponding position of FIG. 8.

The EFN end frame signal for the sequences having $w_3=1$ in its first word position is 79. This signal is much smaller than signals $F_{E1}$ and $F_{E2}$ which define the range of the end point of the utterance stored in store 205. Consequently, signal $E_{T1}$ (waveform 1115) from comparator 211 is not enabled but signal $E_{T2}$ (waveform 1117) from comparator 213 is enabled. Since the utterance end frame EFN for the first word position is smaller than either the $F_{E1}$ or $F_{E2}$ signals, flip-flop 215 in FIG. 2 is reset by signal $E_{T2}$ and sequence storage mode is ended with signal EDT (waveform 1119) disabled.

The CL2 clock signal at the inputs of AND gates 232 and 234 is applied through the path including AND-gate 234, AND-gate 240, and OR-gate 249 to generate a DCS pulse (waveform 1121 at $t_5$) responsive to control signal D and signal $C_1$. The DCS pulse passes through OR-gate 405 and increments sequence signal counter 407. AND-gate 234 is enabled by control signal D from control 230, the $C_1$ signal from flip-flop 388 and the CL2 clock signal. Since the sequence defining signal for $L=1$ in store 411 includes a zero signal in the FSF position, the $\overline{FSF}$ from the output of store 411 signal enables AND-gate 240 and a DCS pulse is produced by OR-gate 249. At this time, the EK pulse (waveform 1123 at time $t_5$) generated on each change in counter 407 enables gate 264. Control 230 is thereby rendered operative to disable signal X and to reenable control signal S at time $t_5$. Control signal S resets flip-flop 388 at time $t_5$ to disable the $C_1$ signal.

Sequence signal counter 407 addresses the $L=2$ position of sequence defining signal store 411 at time $t_5$ as indicated in waveform 1103. The SFN=0 code is read out of register 351 jointly responsive to the $q_p=2$ signal from the $L=2$ address of store 411 and the S control signal (waveform 1101) from control 230. Comparator 383 provides an enabled $\overline{SN}$ signal which enables AND-gate 403 so that sequence signal counter 407 is incremented again at time $t_6$. The $q_p$ state signals store 411 continue to address SFN=0 codes in register 351 until sequence signal counter 407 reaches its $L=18$ position at time $t_7$. In that position, the $q_p=1$ code addresses the first position of register 351 and a SFN=1 code is applied to comparator 383. Responsive to the non-zero SFN code, a SN signal (waveform 1105) is obtained from comparator 383 just after $t_7$, and AND-gate 266 in FIG. 2 is enabled. Control 230 disables control signal S and enables control signal X at $t_8$ in FIG. 11 to initiate a new sequence evaluation mode.

Correspondence and end frame signal generator 209 is enabled by control signal X (waveform 1107) between times $t_8$ and $t_9$ to produce a sequence of frame signals FN beginning at the starting frame SFN=1 from the $q_p=1$ position of register 351. These FN signals select a portion of the utterance feature signals stored in feature signal store 205 via AND-gate 272 and OR-gate 274. Concurrently, the $w_{26}$ signal from store 411 and the FN signal sequence from generator 209 address the successive frame feature signals of the reference word "How". Correspondence and end frame signal generator 209 is responsive to the feature signals from stores 205 and 207 to match the frames of the utterance portion and the reference word "How" in accordance with prescribed criteria. Responsive to the feature signals of the matched frames, a distance signal $d_{1,26}$ representative of the similarity between the utterance portion and the reference word feature signal is produced as well as an end frame signal EFN for the utterance in the first word position of the sequence beginning with the word "How". After the EFN and $d_{1,26}$ signals are produced, generator 209 provides a EX pulse (waveform 1109).

The EX pulse which is supplied to control 230 terminates the sequence evaluation mode by disabling control signal X and initiates the sequence storage mode by enabling control signal D (waveform 1111) at time $t_9$.

In the sequence storage mode, the cumulative correspondence signal $\Phi_p=0$ is obtained from the first position of cumulative correspondence register 301 as addressed by the $q_p=1$ code applied to AND-gate 307 from store 411. The $\Phi_p=0$ code is added to the $d_{1,26}$ code from correspondence signal and end frame generator 209 in adder 387. The resultant sum is compared to the $\Phi_s=$LPN code from the $q_s=8$ position of cumulative correspondence register 321 in comparator 391. Since the $\Phi_1+d_{1,26}$ code is less than LPN code from register 321, a $C_1$ signal is obtained from flip-flop 388 at time $t_{10}$ and the $d_{1,26}$ signal from delay 389 is inserted into the $q_s=8$ position of register 321 via AND-gate 331 and OR-gate 335.

At this time, the EFN end frame signal from generator 209 is inserted into end frame register 361 via AND-gate 375 and OR-gate 377. The $C_1$ signal from flip-flop 388 causes the $q_p=1$ and $w_{26}$ codes from store 411 to be inserted into stores 425 and 427, respectively, as addressed by the $q_s=8$ and $k=1$ signals applied to gates 415 and 417. The placement of the $q_p=1$ and $w_{26}$ codes in registers 425 and 427 is shown in FIGS. 7 and 8. The EFN=79 signal from generator 209 is also applied to comparators 211 and 213 to determine if the end frame of the present word position is within the range of end frames for the utterance ($F_{E1}<$EFN$<F_{E2}$). Signal $E_{T1}$ from comparator 211 is not enabling. Consequently, a DCS pulse (waveform 1121) is obtained at time $t_{11}$ from OR-gate 249 in FIG. 2 via the path including AND-gate 234 and AND-gate 240. The DCS signal is operative to increment counter 407 which in turn produces an EK pulse (waveform 1123) at time $t_{11}$. The EK pulse is applied to control 230 via gate 264 so that the scan mode is reinitiated by enabling control signal S (waveform 1101) and the sequence storage mode is terminated by the disabling of control signal D. Control signal S also resets flip-flop 388 to disable the $C_1$ signal at time $t_{11}$.

Sequence signal counter 407 was incremented to its L=19 position by the DCS signal of the preceding sequence storage mode. Consequently, the $q_p=8$, $W_{27}=$much, $q_s=9$, FSF=0 coded signal appears at the output of sequence defining signal store 411 just after time $t_{11}$. The $q_p=8$ code from store 411 is applied to the address input of starting frame register 351 via AND-gate 355 and OR-gate 357. The zero code in the eighth position of register 351 appears at the output of register 351 as the starting frame output signal SFN. The equality detected in comparator 383 causes the $\overline{SN}$ signal to be enabled which $\overline{SN}$ signal increments sequence signal counter 407 via AND-gate 403 and OR-gate 405, and the L=20 sequence defining signal is addressed just after time $t_{12}$. Since the only nonzero code stored in starting frame register 351 is in its $q_p=1$ starting state position, the successively addressed sequence defining signals in store 411 from position L=20 through position L=31, do not provide an enabled SN output from comparator 383 as indicated in waveform 1105 in FIG. 11. Consequently, the recognizer system of FIGS. 2, 3 and 4 remains in its scan mode for the remainder of the sequence defining signals in the first word position. An EL pulse (waveform 1125) is produced at time $t_{15}$ when counter 407 is incremented after the L=31 position scan. The EL pulse terminates the first word position operation and increments word position counter 409 to its K=2 position.

During the first word position operation, the sequence defining signals $q_p=1$, $w_3=I$, $q_s=2$, FSF=0 and $q_p=1$, $w_{26}=$how, $q_s=8$, FSF=0 were selected. The $q_p=1$ states of these two sequence defining signals correspond to the common starting state shown in the state sequence array of FIG. 5. Consequently, the starting frames of these sequence defining signals were set to nonzero values. Responsive to the selected sequence defining signal, the $q_p=1$, $w_3=I$ signals were stored in the $q_s=2$, $k=1$ addresses of stores 425 and 427, respectively, while the $q_p=1$, $w_{26}=$how were stored in the $q_s=8$, $k=1$ addresses of these stores. At the end of the first word position operation, cumulative correspondence register 321 contains a $\Phi_s=0.392$ in its $q_s=2$ position and a $\Phi_s=0.749$ code in its $q_s=8$ position. These cumulative correspondence signals were obtained for the selected sequences of the first word position. End frame register 361 contains the end frame signal EFN=79 for the $w_3$ and $w_{26}$ partial sequences in both its $q_s=2$ and $q_s=8$ positions. The EFN=79 frame is not a possible endpoint for the utterance. Neither partial sequence ends in a final state. Consequently, no candidate sentence has been selected.

Responsive to the EL pulse applied to control 230 via AND-gate 253 and OR-gate 257, control signal S is disabled while control signal C and control pulse CP are enabled to provide an initialization mode for the second word position. In the second word position initialization mode, the cumulative correspondence signals in register 321 $\Phi_1, \Phi_2, \ldots \Phi_{24}$, are transferred to cumulative correspondence register 301 and the end frame codes for the first word position in register 361 are transferred to starting frame register 351.

Control pulse CP is operative to reset transfer counter 398 to its zero state. Cumulative correspondence register 371 and word position end frame register 351 are addressed by control signal C and the I output of counter 398 applied to AND-gate 339. Cumulative coresponder.ce register 301 is similarly addressed by the C and I signals applied to AND-gate 305 while starting frame register 351 is addressed by the C and I signals applied to AND-gate 353. The successively addressed state position of register 321 are transferred from its output to the input of register 301 via line 311 and inserted into register 301 responsive to the write pulses from AND-gate 303. Similarly, the contents of end frame register 361 are transferred from its output to the input of starting frame registert 351 via line 359 and inserted responsive to the write pulses from AND-gate 303.

While the content of cumulative correspondence register 321 is being transferred to register 301, gate 329 is enabled by control signal C so that an LPN code is inserted into each position of register 321 responsive to the write pulses from AND-gate 339. Zero codes are similarly inserted into register 361 via gate 376 responsive to the write signal from gates 365 and 367. After transfer counter 398 is advanced to its twenty-fourth position and the last storage positions of registers 301, 321, 351 and 361 are operated upon, ending signal EI is generated in the transfer counter.

The EI ending pulse is supplied to sequence signal counter 407 and control 230 via AND-gate 259 and OR-gate 264. Sequence signal counter 407 is reset by the EI pulse. Control 230 is operative to terminate the initialization mode for the second word position and to start the scan mode for the second word position. At this time, positions $q_p=2$ and $q_p=8$ of starting frame register 351 each contains SFN=79 code, the starting frame of the second word positions for the partial sequence including the word "I" and the partial sequence including the word "how".

During the scan of the L=1 position of sequence defining signal memory 411, a zero code is found in the $q_p=1$ position of register 351. The zero code from the $q_p=1$ position of starting frame register 351 causes comparator 383 to enable signal $\overline{SN}$ via inverter 385. Sequence signal counter 407 is incremented to its second position (L=2) by the $\overline{SN}$ signal applied to counter 407 via AND-gate 403 and OR-gate 405. The $q_p=2$ signal from the L=2 position of sequence defining signal store 411 is applied to the address input of register 351 via AND-gate 355. The SFN=79 code from the $q_p=2$ position of register 351 is inserted into correspondence and end frame signal generator 209. The SFN=79 code also causes comparator 383 to enable the SN signal. Responsive to the SN signal, control 230 is switched from its scan to its sequence evaluation condition via AND-gate 266. Control signal S is disabled while control signal X is enabled.

In the sequence evaluation mode, correspondence and end frame signal generator 209 is responsive to the set of feature signals for the word $w_4$=want in feature signal store 205 and the feature signals of the utterance in the sequence of frames beginning at frame number 79 in store 207 to produce the $d_{2,4}$ correspondence signal listed in the L=2 row of Table 1 and to provide the end frame code EFN=101 in row L=2 of Table 1.

TABLE 1

| L  | $q_p$ | $w_j$           | $q_s$ | SFN | EFN | $\Phi_p$ | $d_{2,j}$ | $\Phi_s$ |
|----|-------|-----------------|-------|-----|-----|----------|-----------|----------|
| 2  | 2     | $w_4$ = want    | 3     | 79  | 101 | 0.392    | 0.695     | 1.087    |
| 6  | 2     | $w_5$ = would   | 7     | 79  | 102 | 0.392    | 1.157     | 1.549    |
| 8  | 2     | $w_{22}$ = will | 22    | 79  | 100 | 0.392    | 0.653     | 1.045    |
| 19 | 8     | $w_{27}$ = much | 9     | 79  | 106 | 0.749    | 1.177     | 1.926    |
| 27 | 2     | $w_{28}$ = need | 3     | 79  | 102 | 0.392    | 0.989     | 1.381    |

Upon formation of signals $d_{2,4}=0.695$ and EFN=101, ending pulse EX is produced in generator 209. The EX pulse causes the X signal from control 230 to be disabled and control signal D to be enabled. The enabling of control signal D initiates the sequence storage mode in which the cumulative correspondence signal $\Phi_s$ for the partial sequence "I want" is produced and the $q_p=2$ and $w_4$ signals are stored for later sequence retrieval.

The $q_p=2$ position of register 301 in FIG. 3 is addressed via gates 307 and 309 so that the $\Phi_2$ signal is applied from output of register 301 to one input of adder 387. The $d_{2,4}$ signal from generator 209 is applied to the other input of adder 387 and the output of the adder is applied to one input of comparator 391. The other input of comparator 391 receives the $\Phi_3$ signal from cumulative correspondance register 321. The $q_s=3$ position of register 321 now contains an LPN code. Consequently, the output of comparator 391 sets flip-flop 388 and a $C_1$ signal is obtained therefrom. The delayed $\Phi_s$ signal from delay 389 ($T_1$) is applied to the input of register 321 via gate 331. The $T_1$ signal is inserted into the $q_s=3$ position thereof responsive to the write pulse supplied via AND-gate 324, OR-gate 328 and AND-gate 330. End frame register 361 is also addressed via AND-gate 341 so that the EFN signal appearing at the output of generator 209 is inserted into the $q_s=3$ position of register 361. Sequence state and sequence word stores 425 and 427 are addressed by the $q_s=3$, k=2 signals applied to AND-gates 415 and 419, respectively. Responsive to signal $C_1$ applied to gate 413, the $q_p=2$ code is inserted into store 425 while the $w_4$ code is inserted into store 427 as indicated in FIGS. 7 and 8.

The EFN=101 code from correspondence and end frame signal generator 209 is also supplied to comparators 211 and 213. Since the EFN code is less than the $F_{E1}=229$ code, signal $E_{T1}$ from comparator 211 is not enabled. The EFN signal, however, is less than the $F_{E2}=259$ signal applied to comparator 213 whereby signal $E_{T2}$ is enabled to reset flip-flop 215. The endpoint frame EFN=101 for the partial sequence "I want" is not in the range of utterance endpoint frames $F_{E1}$ and $F_{E2}$. Consequently, this partial sequence is not evaluated as a candidate for the utterance whose feature signals are stored in store 207, and a DCS signal is produced via gates 234, 240, and 249. The DCS signal increments sequence signal counter 407 which generates an EK signal. Control 230 is switched back into its scan state responsive to the EK signal and flip-flop 388 is reset by the S control signal.

The re-initiated scan mode is terminated after the L=6 position of store 411 is reached and a nonzero SFN code is obtained from the $q_p=2$ position of starting frame register 351 as indicated in the L=6 row of Table 1. At this time, a sequence evaluation mode is initiated by control 230 so that the correspondence signal $d_{2,5}$ and the EFN end frame signal listed in the L=6 row of Table 1 are obtained. In the sequence storage mode initiated by signal EX from generator 209, the $\Phi_2$ signal is retrieved from the $q_p=2$ position of register 351. The $\Phi_2$ signal is added to the $d_{2,5}$ signal and the resultant $\phi_s$ signal is stored in the $q_s=7$ position of register 321 as indicated in row L=6 of Table 1. The $q_p=2$ and $w_5$=would codes are placed in stores 425 and 427, respectively, as addressed by the $q_s=7$ and k=2 signals responsive to the $C_1$ signal from flip-flop 388.

During the remainder of the second word position operation, the scan of sequence defining signal store 411 is interrupted at positions L=8, 19 and 27 for which nonzero SFN codes are stored in starting frame register 351 as indicated in Table 1. In the sequence evaluation and sequence storage modes for the L=8 position, the partial sequence "I will" is evaluated and the results stored. The $\Phi_{22}$ cumulative correspondence signal is formed from the $\Phi_2=0.392$ signal in the $q_p=2$ position of register 351 is the $d_{2,22}=0.653$ signal from generator 209 and stored in the $q_{22}$ position of register 361. The EFN=100 code produced as the end frame for the second word position of the "I will" partial sequence is stored in the $q_s=22$ position of register 361. The $q_p=2$ and $w_{22}$ codes are placed in the $q_s=22$, k=2 locations of stores 425 and 427.

In similar manner, the partial sequence "how much" for the L=19 position and the partial sequence "I need" for the L=27 position of sequence defining signal store 411 are evaluated. During the sequence storage mode for the L=27 row of Table 1, the correspondence signal $d_{2,28}=0.989$ is added to the cumulative correspondence signal $\Phi_2=0.392$ from the $q_p=2$ position of cumulative correspondence register 301 in adder 387. The resultant sum (1.381) is applied to one input of comparator 391. The cumulative correspondence signal $\Phi_3=1.087$ from the $q_s=3$ position of cumulative correspondence register 321 is supplied to the other input of comparator 391. Since the previously stored $\Phi_s$ signal is smaller than the output of adder 387, flip-flop 388 is not set and the $C_1$ signal therefrom remains disabled. Consequently, the write inputs of registers 321 and 361 as well as the write inputs to stores 425 and 427 are not enabled and the results shown in row L=2 of Table 1 are retained in these registers and stores. In effect, the partial sequence "I need" is discarded since its cumulative correspondence signal is greater than the cumulative correspondence signal already stored in the $q_s=3$ position of register 321.

Upon termination of the scan of the L=31 position of store 411, an EL pulse rather than an EK pulse is obtained from sequence signal counter 407 and word position counter 409 is incremented to its k=3 state. Since flip-flop 215 was reset by the $E_{T2}$ output of comparator 213 in the second word position operation, AND-gate 253 is turned on by the EL pulse so that control 230 is switched to the initialization mode of the third word position.

Responsive to enabled pulse CP and enabled control signal C during the initialization mode, the contents of cumulative correspondence register 321 are transferred to register 301 and the LPN code is inserted into each position of register 321. Similarly, the contents of word position end frame register 361 are transferred to starting frame register 351 and a zero code is inserted into each position of end frame register 361. These transfers are addressed by the I signals from transfer counter 398, which counter is successively incremented responsive to the CL1 clock pulses applied to gate 397 when signal C is enabling. At the end of the transfer, counter 398 is in its twenty-fourth state and ending pulse EI is obtained. The EI pulse from counter 398 is applied to control 230 via AND-gate 359 and OR-gate 364. Control 230 is thereby switched from its third word position initialization mode to its scan mode.

At the beginning of the third word position scan mode, nonzero SFN starting frame codes are stored in the $q_p=3$, 7, 9, and 22 positions of starting frame register 351 as indicated in Table 2.

TABLE 2

| L | $q_p$ | $w_j$ | $q_s$ | SFN | EFN | $\Phi_p$ | $d_{3,j}$ | $\Phi_s$ |
|---|---|---|---|---|---|---|---|---|
| 3 | 3 | $w_7$ = some | 4 | 101 | 123 | 1.807 | 0.902 | 1.989 |
| 7 | 7 | $w_6$ = like | 3 | 102 | 128 | 1.549 | 0.250 | 1.799 |
| 9 | 22 | $w_{23}$ = pay | 23 | 100 | 125 | 1.045 | 0.628 | 1.673 |
| 12 | 3 | $w_{12}$ = A | 15 | 101 | 120 | 1.087 | 0.744 | 1.831 |
| 20 | 9 | $w_1$ = is | 10 | 106 | 132 | 1.926 | 0.580 | 2.506 |
| 23 | 3 | $w_{10}$ = TO | 12 | 101 | 125 | 1.087 | 0.903 | 1.990 |

Responsive to these nonzero SFN codes, the third word position scan mode is interrupted at the L=3, 7, 9, 12, 20, and 23 positions of sequence defining signal store 411. The scan of the L=3 position of store 411 causes the SN signal from comparator 383 to be enabled. A sequence evaluation mode for the L=3 position of store 411 is thereby started. In this sequence evaluation node, distance signal $d_{3,7}=0.902$ is generated responsive to the feature signals for the $w_7$=some code stored in reference feature signal store 207 and the feature signals for the utterance in store 205 beginning at starting frame SNF=101 as indicated in Table 2. The ending frame code EFN=123 is also generated in generator 209 for the partial sequence "I want some". Control 230 is then switched to its sequence storage mode by pulse EX from generator 209.

In the sequence storage mode, the sum of the $\Phi_3$ and $d_{3,7}$ signals (1.989) is formed in adder 387. Since this sum is less than the LPN code stored in the $q_s=4$ position of register 321, flip-flop 388 is set and the $C_1$ signal therefrom is enabled. As aforementioned with respect to the first and second word position operations, the enabled $C_1$ signal causes the $T_1$ output of delay 389 to be inserted in the $q_s=4$ position of cumulative correspondence register 321. The EFN output of generator 209 is inserted into the $q_s=4$ position of end frame register 361. The $q_p=3$ code is also inserted in the $q_s=4$, k=3 position of sequence state store 425 and the $w_7$ code is inserted in the $q_s=4$, k=3 position of sequence word store 427. The codes placed in these stores are shown in FIGS. 7 and 8 and are indicated in the L=3 row of Table 2.

The other rows of Table 2 show the results of the sequence evaluation and sequence storage modes for the remaining nonzero SFN codes in starting frame register 351. The $\Phi_s$ column of Table 2 lists the cumulative correspondence signals for the partial sequences of the third word position while the EFN column lists the third word position endpoint frames of the stored selected utterance portion for these partial sequences. In row L=9, for example, the cumulative correspondence $\Phi_{23}$ of the partial sequence "I will pay" to the utterance is 1.673 and the ending frame of the utterance for this sequence is EFN=125.

None of the sequence defining signals of the third word position ends in a final state for which FSF is 1 and none of the EFN codes in Table 2 is in the range of utterance endpoint frame numbers 229 and 259. Consequently none of the partial sequences of the third word position are possible candidates for the utterance in store 205. Therefore, no candidate sentence evaluation is performed during the third word position operation.

At the end of the scan of the L=31 position of sequence defining signal store 411, a EL pulse rather than an EK pulse appears at the output of sequence signal counter 407 and word position counter 409 is incremented to its k=4 state. Responsive to the EL pulse at the input of gate 253, Control 230 is switched to the initialization mode of the fourth word position during which control signal C is present. In the fourth word position initialization, the contents of cumulative correspondence register 321 are transferred to register 301 and the contents of end frame register 361 are transferred to starting frame register 351. During these transfers, a LPN code is inserted in each $q_s$ state position of correspondence register 321 and a zero code is inserted in each $q_s$ state position of end frame register 361.

The scan mode for the fourth word position is initiated after the twenty-fourth count of transfer counter 398 by the EI pulse therefrom. The EI pulse is applied to control 230 via gates 259 and 264 so that the S control signal is enabled and the C control signal is disabled. The EI pulse is also applied to sequence signal counter 407 to reset the counter to its L=1 position. The fourth word position scan mode is thereby initiated. As described with respect to the third word position operation, the fourth word position scan mode is interrupted each time a nonzero SFN signal is read out of starting frame store 351 responsive to the successive outputs of sequence defining signal store 411.

TABLE 3

| L | $q_p$ | $w_j$ | $q_s$ | SFN | EFN | $\Phi_p$ | $d_{4,j}$ | $\Phi_s$ |
|---|---|---|---|---|---|---|---|---|
| 3 | 3 | $w_7$ = some | 4 | 128 | 149 | 1.799 | 0.480 | 2.279 |
| 4 | 4 | $w_8$ = information | 5 | 123 | 162 | 1.989 | 0.721 | 2.71 |
| 10 | 23 | $w_{29}$ = In | 24 | 132 | 150 | 1.673 | 0.771 | 2.444 |
| 12 | 3 | $w_{12}$ = A | 15 | 128 | 149 | 1.799 | 0.659 | 2.458 |
| 13 | 15 | $w_{17}$ = first | 16 | 120 | 156 | 1.831 | 0.986 | 2.817 |

TABLE 3-continued

| L | $q_p$ | $w_j$ | $q_s$ | SFN | EFN | $\Phi_p$ | $d_{4,j}$ | $\Phi_s$ |
|---|---|---|---|---|---|---|---|---|
| 16 | 15 | $w_{20}$ = Non-stop | 18 | 120 | 154 | 1.831 | 0.710 | 2.541 |
| 21 | 10 | $w_{13}$ = The | 11 | 132 | 151 | 2.506 | 0.642 | 3.148 |
| 23 | 3 | $w_{10}$ = To | 12 | 128 | 149 | 1.799 | 0.682 | 2.481 |
| 24 | 12 | $w_{11}$ = Make | 13 | 125 | 151 | 1.990 | 1.304 | 3.294 |
| 28 | 12 | $w_{14}$ = return | 19 | 125 | 150 | 1.990 | 0.862 | 2.852 |

Table 3 lists the sequence defining signals for which there are nonzero starting frame codes, the fourth word position starting frame and ending frame codes SFN and EFN, the sequence cumulative correspondence signal $\Phi_p$ for the fourth word position, the correspondence signal $d_{4,j}$ for the fourth word position and the cumulative correspondence signal $\Phi_s$ for the fourth word position. The L=4 row of Table 3 corresponds to the partial sequence "I want some information". The starting frame code for this sequence is SFN=123. As a result of the operation of correspondence and end frame signal generator 209 in the sequence evaluation mode, a correspondence signal $d_{4,8}=0.721$ and an ending frame signal EFN=162 are obtained. In the succeeding sequence storage mode, the partial sequence cumulative correspondence signal for the fourth word position $\Phi_s=2.71$ is stored in the $q_s=5$ position of register 321 while the EFN=162 signal is stored in the corresponding position of register 361. The $q_p=4$ and $w_8$ codes are also stored in stores 425 and 427 as addressed by the $q_s=5$ and k=4 codes.

The sequence "I want some information" ends in a final state for which an FSF=1 signal is obtained from store 411. The ending frame code EFN=162, however, is less than the minimum utterance end point frame $F_{E1}=229$. Consequently, the sequence is not evaluated as a possible candidate for the input utterance. None of the other sequences of the fourth word position listed in Table 3 ends in a final state. Thus, there is no sequence in the fourth word position which is a candidate for the input utterance. After the L=31 position of sequence defining signal store 411 is selected, the SFN=0 code is obtained from the $q_p=21$ position of register 351. The resulting $\overline{SN}$ signal from inverter 385 causes an EL pulse to be produced by sequence signal counter 407 which EL pulse is applied to Control 230 via AND-gate 253 and OR-gate 257. Word position counter is incremented to its k=5 position by the EL pulse.

Responsive to the EL pulse, Control 230 enables control pulse CP and control signal C whereby the initialization mode of the fifth word position is started. In this initialization mode, the fourth word position cumulative correspondence signals $\Phi_s$ in cumulative correspondence register 321 are transferred to register 301 to become the $\Phi_p$ signals of the fifth word position. Register 321 is cleared so that each position thereof contains a LPN code. In similar manner, the EFN signals of the fourth word position in word position end frame register 361 are transferred to starting frame register 351 and register 361 is cleared so that each position thereof contains a zero code. Ending pulse EI is obtained from transfer counter 398 when the counter is in its twenty-fourth state. The EI ending pulse resets counter 407 and is applied to Control 230 via AND-gate 259 and OR-gate 264 so that Control 230 is switched to its scan mode during which control signal S is enabled.

Table 4 lists the sequence defining signals for which a nonzero starting frame code SFN is stored in starting frame register 351 during the fifth word position operation.

TABLE 4

| L | $q_p$ | $w_j$ | $q_s$ | SFN | EFN | $\Phi_p$ | $d_{5,j}$ | $\Phi_s$ |
|---|---|---|---|---|---|---|---|---|
| 4 | 4 | $w_8$ = information | 5 | 149 | 206 | 2.279 | 0.221 | 2.5 |
| 5 | 5 | $w_1$ = please | 6 | 162 | 192 | 2.71 | 0.0532 | 3.242 |
| 11 | 24 | $w_{25}$ = cash | 6 | 150 | 167 | 2.444 | 0.847 | 3.391 |
| 13 | 15 | $w_{17}$ = first | 16 | 149 | 169 | 2.458 | 1.094 | 3.552 |
| 14 | 16 | $w_{18}$ = class | 17 | 156 | 171 | 2.817 | 0.913 | 3.73 |
| 17 | 18 | $w_{21}$ = flight | 6 | 154 | 179 | 2.541 | 1.198 | 3.739 |
| 22 | 11 | $w_2$ = fare | 6 | 151 | 191 | 3.148 | 0.706 | 3.854 |
| 24 | 12 | $w_{11}$ = make | 13 | 149 | 164 | 2.481 | 0.581 | 3.062 |
| 25 | 13 | $w_{12}$ = A | 14 | 151 | 165 | 3.292 | 0.703 | 3.997 |
| 28 | 12 | $2_{14}$ = return | 19 | 149 | 174 | 2.481 | 0.725 | 3.206 |
| 29 | 19 | $w_{24}$ = in | 20 | 150 | 162 | 2.852 | 0.445 | 3.297 |

Also listed in Table 4 are the starting frame codes SNF, the ending frame codes EFN, and the distance signals $d_{5,j}$ which are obtained in the sequence evaluation mode for each nonzero SFN sequence. The $\Phi_p$ cumulative correspondence signal in Register 301 during the fifth word position is shown for each of the nonzero SFN sequences. The $\Phi_s$ cumulative correspondence codes of these sequences which are stored in Register 321 during the fifth word position sequence storage modes are set forth. For example, the L=4 row of Table 4 has a starting frame code SFN=149 in the $q_p=4$ position of Register 351. Responsive to the SFN=149 code and the $w_8$ signal from sequence defining signal store 411, correspondence and end frame signal generator 209 produces a $d_{5,8}=0.221$ signal and an EFN=206 endpoint frame signal which results fvom the comparison of the feature signals for the $w_8$ code and the utterance portion fegin-ning at frame 149.

In the succeeding sequence storage mode, the sum of the $\Phi_p$ and $d_{5,8}$ codes is formed and stored in Register 361 as the cumulative correspondence signal $\Phi_s$. The ending frame code EFN=206 is stored in the $q_s=5$ state position of ending frame Register 361 while the $q_p=4$ and $w_8$ codes are stored in the $q_s=5$, k=5 positions of stores 425 and 427 respectively. In this manner the sequence "I would like some information" is evaluated. The sequence of the L=4 row of Table 4 ends in final gate $q_s=5$. The endpoint frame code EFN=206 however is less than the $F_{E1}=229$ signal applied to one input of comparator 211. Consequently signal $E_{T1}$ at the output of comparator 211 is not enabling. The sequence "I Would Like Some Information" is not a candidate for the input utterance. Gates 234, 242, 245, and 249 are operative to produce a DCS signal which increments counter 407 and the EK signal from counter 407 switches control 230 to its scan mode.

The scan mode is interrupted for each row shown in Table 4. Each of rows L=5, 11, 17, and 22 represents a sequence that ends in final state $q_s=6$. None of the sequences, however, terminates in an endpoint frame EFN which is equal to or greater than the $F_{E1}$ signal. Thus, none of these sequences is a candidate for the input utterance. The fifth word position operation terminates when an EL pulse is obtained from sequence signal counter 407 after the L=31 position of store 411 is scanned and word position counter 409 is incremented to its k=6 state. Since all of the EFN ending frames listed in Table 4 is less than the $F_{E2}=259$ signal applied to one input of comparator 213, the $E_{T2}$ signal is enabled whereby flip-flop 215 is reset during the fifth word position. Responsive to the $\overline{EOI}$ reset output of flip-flop 215 and the EL pulse from counter 405, gates 253 and 257 cause Control 230 to be switched to start the sixth word position initialization mode.

During the sixth word position initialization mode, the $\Phi_s$ cumulative correspondence signals listed in Table 4 are transferred from cumulative correspondence Register 321 to cumulative correspondence Register 301. For example the $\Phi_s=3.552$ signal of row L=13 of Table 4 is transferred from the sixteenth state position of Register 321 to the sixteenth state position of Register 301. The ending frame EFN codes of Table 4 are transferred from ending frame Register 361 to starting frame Register 351. For example, the EFN=169 code listed in the L=13 row of Table 4 is transferred from the sixteenth position of Register 361 to the corresponding position of Register 351. During the transfers of registers 321 and 361 to registers 301 and 351, respectively, an LPN code is inserted in each position of register 321 and a zero code is inserted into each position of register 361.

At the end of the twenty-fourth position transfer an EI pulse from transfer counter 398 resets counter 407 and is supplied to control 230 via AND-gate 259 and OR-gate 264. Control 230 is thereby switched to the scan mode during which control signal S is enabling. At the beginning of the sixth word position scan mode, only the $q_p=5$, 13, 14, 16, 17, 19 and 20 positions of register 351 contain nonzero starting frame SFN codes as listed in Table 5.

TABLE 5

| L | $q_p$ | $w_j$ | $q_s$ | SFN | EFN | $\Phi_p$ | $d_{6,j}$ | $\Phi_s$ |
|---|---|---|---|---|---|---|---|---|
| 5 | 5 | $w_9$ = please | 6 | 206 | 237 | 2.5 | 0.872 | 3.372 |
| 14 | 16 | $w_{18}$ = class | 17 | 169 | 191 | 3.552 | 1.026 | 4.578 |
| 15 | 17 | $w_{19}$ = seat | 5 | 171 | 198 | 3.73 | 0.790 | 4.52 |
| 25 | 13 | $w_{12}$ = A | 14 | 164 | 189 | 3.062 | 0.793 | 3.855 |
| 26 | 14 | $w_{13}$ = reserv. | 5 | 165 | 198 | 3.997 | 0.827 | 4.824 |
| 29 | 19 | $w_{24}$ = In | 20 | 174 | 206 | 3.206 | 0.600 | 3.806 |
| 30 | 20 | $w_{15}$ = the | 21 | 162 | 187 | 3.297 | 0.810 | 4.107 |

When the L=5 position of sequence defining signal store 411 is reached, an SFN=206 code is obtained from the $q_p=5$ position of register 351. This nonzero SFN code causes an SN signal to be produced by comparator 383 and control 230 is switched to its sequence evaluation mode via AND-gate 266. In the sequence evaluation mode, distance signal $d_{6,9}$ and ending frame EFN=237 code are obtained from correspondence and end frame signal generator 209 responsive to the feature signals for the $w_9$ reference word and the portion of the utterance beginning at frame 206.

The EX signal from generator 209 at the end of the sequence evaluation mode switches control 230 so that control signal D is enabling and the sequence storage mode is initiated. In the sequence storage mode, the sum of the $\Phi_p=2.5$ signal from the $q_p=5$ position of register 301 and the $d_{6,9}=0.872$ signal from generator 209 is formed in adder 387. The output of adder 387 is compared to the LPN code obtained from the $q_s=6$ position of register 321 and comparator 391 sets flip-flop 388 so that the $C_1$ signal therefrom is enabled. Responsive to the $C_1$ signal the delayed output of adder 387 is inserted into the $q_s=6$ position of register 321 while the EFN=237 code is inserted into the $q_s=6$ position of end frame register 361. The $q_p=5$ and $w_9$ codes are similarly inserted in stores 425 and 427 as addressed by the $q_s=6$, k=6 codes from store 411 and word position counter 409.

The EFN=237 code from signal generator 609 is applied to the inputs of comparators 211 and 213. Since the ending frame is between the $F_{E1}$ and $F_{E2}$ utterance ending frames, both signals $E_{T1}$ and $E_{T2}$ are set. Additionally the FSF=1 signal is obtained from the output of sequence defining signal store 411. Since the $q_s$ code in the L=5 position of store 411 is a final state, the $C_1$ pulse passes through AND gates 234, 242 and 247 responsive to the enabled $E_{T1}$, $E_{T2}$ and FSF signals applied to gates 236 and 242. A CFT pulse is generated at the output of AND-gate 247. The CFT pulse occurs when a completed sequence having an ending frame code within the end frame limits of the input utterance is detected. The completed sequence "I would like some information please" is thereby selected as a candidate for the input utterance whose feature signals are stored in store 205.

Responsive to the CFT pulse, control 230 is switched to its candidate selection mode during which control signal E is enabling. In the candidate selection mode, the $\Phi_s$ cumulative correspondence signal for the selected sequence is supplied to sentence selector 430 together with the current word position k from word position counter 409. Sentence selector 430 is operative to form a signal corresponding to $\Phi_s/k$ for the candidate sentence and this signal is compared to the corresponding signal stored in sentence selector 430 for the previously selected sequence. In the event that the previously stored $\Phi_s/k$ signal is less than the newly computed value, ending pulse EE is generated and the scan mode is reinitiated. Where the previously stored $\Phi_s/k$ signal is greater than the just calculated $\Phi_s/k$ signal, the just calculated value is stored. The newly selected sequence is retrieved from sequence word store 427 and placed in selected sentence store 438 under control of sentence selector 430.

Because of coarticulation or the introduction of acoustic artifacts in the utterance, an erroneously high correspondence signal may be generated for one or more words. Under these circumstances, the aforementioned $\Phi_s/k$ candidate selection arrangement is subject to error. An alternative candidate selection arrangement may be employed to reduce the liklihood of such errors. In the alternative arrangement, the word position correspondence signals $d_k$ for the candidate are sorted in ascending order. The median value of the individual correspondence signals is produced in accordance with $$\bar{d} = \begin{cases} d_{[n/2]+1} & \text{for k odd} \\ \frac{1}{2}[d_{[k/2]} + d_{[k/2]+1}] & \text{for k even} \end{cases} \quad (3)$$

The largest $d_k$ is discarded if $$(d_k - d_{k-1})/(d_k - \bar{d}) > R \quad (4)$$

where R=0.25, the expected value of the left-hand side of equation if k<20 samples are drawn from a unit normal distribution. The cumulative correspondence signal for the candidate sequence is then obtained in accordance with $$\Phi_s = \begin{cases} \frac{1}{k} \sum_{i=1}^{k} d_{ki} & \text{if } d_k \text{ is not discarded} \quad (5) \\ \frac{1}{k-1} \sum_{i=1}^{k-1} d_{ki} & \text{if } d_k \text{ discarded} \end{cases}$$

The alternative candidate selection is implemented in the circuit of FIGS. 2, 3, and 4 by the addition of sequence correspondence store 475 shown in box A of FIG. 4. Store 475 receives the output of delay 389 in FIG. 3 during each sequence storage mode. The $T_1$ signal from delay 389 is placed into the $q_s$, k position of store 475 as addressed by the outputs of gates 415 and 419 which are applied to the address inputs of store 475.

Sentence selector 430 is modified to include a data processor such as the Data General Corporation MicroNOVA Computer or microprocessor arrangements well known in the art. The processor arrangement is adapted to perform the generation of the $d_k$ signals from information stored in sequence correspondence store 475 in accordance with the operations of equations 3, 4, 5. The modified sentence selector also includes a read only memory in which is permanently stored the sequence of instruction codes required for the candidate selection processing. The stored instructions are listed in Fortran language form in Appendix B.

In the present candidate selection mode, the $\Phi_s=3.372$ code corresponding to the sequence "I would like some information please" is transferred from the $q_s=6$ position of cumulative correspondence register 321 to sentence selector 430. The $k=6$ signal is transferred to sentence selector 430 from word position counter 409 and the $\Phi_s/k=0.562$ signal is formed in sentence selector 430. Selector 430 was previously reset to an LPN code in the initial conditioning mode whereby the $\Phi_s/k=0.562$ code is stored as the smaller $\Phi_s/k$ value in selector 430. The word position signal is stored as signal $M=6$, and the $q_s=6$ signal from store 411, is also stored as signal $Q_2$. The $Q_2=6$ signal is applied to AND-gate 417 while the $M=6$ signal is applied to AND-gate 421. In this manner, the reference word $w_9$ is obtained from the sixth word and sixth state position address of store 427. The $w_9$ code is inserted into selected sentence store 438. In similar manner, the $q_p=5$ code in the sixth word and sixth state position address of the sequence state store 425 is transferred from store 425 to sentence selector 430. The M signal is decremented to five to address the fifth word position and the $Q_2$ position is changed to the fifth state position corresponding to the $q_p=5$ code from store 425. Responsive to the $Q_2=5$, $M=5$ address, the $w_8$ code is transferred from sequence word store 427 to selected sentence store 438 and the $q_4$ code is transferred from sequence state store 425 to sentence selector 430.

The M signal is then decremented to four and the $w_7$ word is transferred from the $Q_2=4$ position of store 427 to store 438 while the $q_p=3$ code is transferred from store 425 to selector 430. In like manner, the remaining codes are transferred from sequence word store 427 to selected sentence store 438. When the M signal in sentence selector 430 is decremented to its zero state, the word codes $w_3$, $w_5$, $w_6$, $w_7$, $w_8$ and $w_9$ are stored in selected store 438. The sequence "I would like some information please" is thereby tentatively selected as the best candidate for the input utterance at this time in the sixth word position operation. Better candidates may be selected at a later time in the sixth or subsequent word positions. Each candidate must end in a final state and have an endpoint frame within the permissible range determined by comparators 211 and 213. The final selection can be made only when the last possible word position operation is completed, a word position operation is completed in which no cumulative correspondence signal results or a word position operation is completed for which all EFN endpoint frame codes were greater than the $F_{E2}$ code defining the last possible termination point of the utterance.

Responsive to the EE ending pulse from sentence selector 430, a DCS pulse is obtained from OR-gate 249. Sequence counter 407 is advanced by the DCS signal from gate 249 and the EK pulse from counter 407 causes control 230 to be switched to its scan mode. The scan mode for the sixth word position is interrupted for sequence evaluation and storage mode as indicated in Table 5. For positions $L=14$, 25, 29 and 30, partial sequences are evaluated since none of the $q_s$ codes for these positions are final states. Row positions $L=15$ and 26 however, end in final state $q_s=5$, but the EFN endpoint frame codes shown for these positions in Table 5 are less than the minimum input utterance endpoint frame. Consequently, neither of the sequences "I want a first class seat" or "I want to make a reservation" are evaluated as candidates for the input utterance. The sixth word position operation is terminated upon generation of the EL signal in sequence signal counter 407 after the thirty-first position of sequence defining signal store 411 is scanned. At this time word position counter 409 is incremented to its $k=7$ position, counter 407 is reset to its first position and control 230 is switched to the initialization mode for the seventh word position.

After the transfer of the cumulative correspondence signals stored in register 321 to register 301 and the endpoint frame EFN codes from register 361 to starting frame register 351 and the resetting of registers 321 and 361, control 230 is switched to its scan mode as previously described. Table 6 summarizes the seventh word position operation in which the scan mode is interrupted for the $L=5$, 15, 26, 30, and 31 position of sequence defining signal store 411.

TABLE 6

| L | $q_p$ | $w_j$ | $q_s$ | SFN | EFN | $\Phi_s$ | $d_{7,j}$ | $\Phi_2$ |
|---|---|---|---|---|---|---|---|---|
| 5 | 5 | $W_9$ = please | 6 | 198 | 234 | 4.52 | 1.068 | 5.588 |
| 15 | 17 | $W_{19}$ = seat | 5 | 191 | 212 | 4.578 | 0.572 | 5.09 |
| 26 | 14 | $W_{13}$ = reservation | 5 | 189 | 228 | 3.855 | 0.898 | 4.753 |
| 30 | 20 | $W_{15}$ = the | 21 | 206 | 219 | 3.806 | 0.574 | 4.380 |
| 31 | 21 | $W_{16}$ = morning | 6 | 187 | 206 | 4.107 | 0.755 | 4.862 |

Since the $L=5$ row of Table 6 shows that the sequence defining signal ends in final state $q_s=6$ and the endpoint frame EFN code is between the $F_{E1}=229$ and $F_{E2}=259$ utterance end point frames, a CFT pulse appears at the output of AND-gate 247 during the sequence storage mode for the $L=5$ position. The CFT pulse switches control 230 to its candidate selection mode during which control signal E is enabled. Sentence selector 430 is rendered operative by the E control signal and the $\Phi_s=5.588$ cumulative correspondence signal from the $q_s=6$ position of cumulative correspondence register 321 is transferred therefrom to the sentence selector. In sentence selector 430, the $\Phi_6$ signal is divided by the word position signal $k=7$ and the resultant is 0.798. This signal which is representative of the correspondence between the sequence "I want a first class seat please" and the input utterance is compared to the $\Phi_6/6$ signal (0.562) for the sequence "I would like some information please" stored in selected sentence store 438. Since the previously stored selected sequence has a lower $\Phi_s/k$ signal, an EE ending pulse is generated in sentence selector 430 to switch control 230 back to its scan state.

Although the scan mode is interrupted four more times in the 7th word position, these interruptions do not result in the initiation of another sequence selection mode. While each of the sequences of the L=15, 26 and 31 rows of Table 6 ends in a final state, the endpoint EFN in each of these rows is less than $F_{E1}=229$. The L=30 row of Table 6 does not end in a final state and does not terminate within the endpoint range of utterance end frames.

After the sequence storage mode for the L=31 sequence defining signal in sequence defining signal store 411 a DCS signal is obtained from OR-gate 249. The DCS signal is enabled since the EFN endpoint frame code of row L=31 of Table 6 is less than the minimum endpoint frame of the utterance. This DCS signal increments sequence signal counter 407 which, in turn, produces a EL word position ending pulse. The EL signal advances word position counter 409 to its k=8 position and switches control 230 to its eighth word position initialization mode via AND-gate 253 and OR-gate 257.

As previously described, the contents of cumulative correspondence register 321 are transferred to cumulative correspondence register 301 while the contents of word position end frames store 316 are transferred to word position starting frame store 351 during the eighth word position initialization mode. Each position of register 321 is reset to an LPN code and each position of register 361 is reset to a zero code. Upon completion of the initialization operation, an EI pulse is produced by transfer counter 398. The EI pulse resets sequence signal counter 407 and switches control 230 to its eighth word position scan mode via AND-gate 259 and OR-gate 264. Zero valued starting frame codes SFN are obtained during the firs four positions of the eighth word position scan. Responsive to the L=5 sequence defining signal in store 411, an SFN=228 starting frame code is obtained from the $q_p=5$ position of starting frame register 351 as indicated in row L=5 of table 7.

TABLE 7

| L | $q_p$ | $w_j$ | $q_s$ | SFN | EFN | $\Phi_p$ | $d_{8,j}$ | $\Phi_s$ |
|---|---|---|---|---|---|---|---|---|
| 5 | 5 | $w_9$ = please | 6 | 228 | 244 | 4.753 | 10,000 | 10,004 |
| 31 | 21 | $w_{16}$ = morning | 6 | 219 | 244 | 4.380 | 0.789 | 5.109 |

Detection of the nonzero SFN code produces a SN signal at the output of comparator 383. Control 230 is switched into its sequence evaluation mode by the SN signal applied via AND-gate 266.

Correspondence and end frame signal generator 209 produces a very high correspondence signal $d_{8,9}$ and an ending frame code EFN=244 during the sequence evaluation mode. Since the sequence designated in the L=5 row of table 7 ends in a final state $q_s=6$ and the ending frame is between $F_{E1}=229$ and $F_{E2}=259$, the sequence "I would like a first class seat please" is a candidate for the unknown utterance. Consequently, after the sequence storage mode for the eighth word position, a CFT pulse is obtained from AND-gate 247 and control 230 is switched to the candidate selection mode. The $\Phi_s/k$ signal for the newly detected candidate sequence, however, is much higher than the $\Phi_s/k$ signal stored in sentence selector 430 for the last detected candidate. Thus, the candidate sentence in store 438 remains unchanged and an EE ending pulse is obtained from sentence selector 430. The EE ending pulse switches control 230 to the scan mode via OR-gate 249 and sequence signal counter 407. The scan mode is interrupted by detection of an SFN=219 code in the twenty-first position of starting frame register 351 as indicated in the L=31 row of table 7. The sequence evaluation and sequence storage modes for the L=31 position of the eighth word position results in an endpoint frame code EFN=244 and a cumulative correspondence signal $\Phi_s=5.169$ for the sequence. Since the sequence ends in a final state ($q_s=6$) and the endpoint frame EFN is between $F_{E1}$ and $F_{E2}$, the sequence "I would like to return in the morning" is a candidate for the input utterance. Therefore an CFT pulse is produced by AND-gate 247 and control 230 switches to its candidate selection mode.

In the candidate selection mode the $\Phi_s/k$ signal for the newly detected sequence is found to be greater than the $\Phi_s/k$ signal for the previously stored sequence "I would like some information please." Consequently the previously stored sentence remains in store 438 and an EE ending pulse is produced by sentence selector 430. A DCS pulse is obtained from OR gate 249 whereby sequence signal counter 407 is incremented and a EL pulse is obtained therefrom. The EL pulse increments word position counter to its k=9 position.

In accordance with the state sequence diagram of FIG. 5, all sequences terminate in the eighth word position. All possible candidates for the input utterance have been evaluated by the end of the eighth word position operation. Comparator 284 in FIG. 2 provides an enabling output when the k signal from word position counter is equal to a k constant from code generator 393. For the state sequence array of FIG. 5, a coded signal K=9 is applied to one input of comparator 284 from generator 393. Comparator 284 is enabled when the output of word position counter 409 reaches its ninth state and control 230 is switched to its sequence identification mode during which control signal F is enabled.

Responsive to control signal F, the sequence stored in store 438 is read out via line 457 to sentence code generator 440. The sentence code generator is operative to produce a coded signal corresponding to the identified sequence for use in utilization device 467. Utilization device 467 may comprise a data processor adapted to produce an answer to the inquiry recognized by the recognizer circuit of FIGS. 2, 3, and 4 via speech synthesizer 461 and audio reproducer 463. The output of sentence code generator 440 may be directly applied to speech synthesizer 461 so that the inquirer may verify the recognition of his request.

After the code for the recognized sentence is available at the output of sentence code generator 440, the code generator produces an EF signal. Control 230 is switched by the EF pulse from its utterance identification mode to an available mode in which control signal Z is enabled. Control signal Z is applied to AND gate 287. When signal Z is enabled, an ST starting pulse may pass through gate 287 to initiate an utterance recognition. During the utterance recognition, signal Z is disabled so that only a single utterance identification is performed at a time.

While the invention has been shown and described with references to a particular illustrative embodiment, it is to be understood that various modifications in form and detail may be made by those skilled in the art without departing from the spirit and scope of the invention. For exaple, the described recognition arrangement may be utilized to recognize patterns other than speech where the reference words are replaced by suitable representations of such patterns. Additionally, the logic circuit arrangements of the described embodiment may be replaced by digital processing apparatus such as microprocessors equipped with permanently stored instruction codes.

APPENDIX A

```
C     DYNAMIC TIME WARP PROGRAM
      COMMON /DWDATA/TMIN,TMAX,NFC,NFR,IDLT
      DIMENSION R(9,75),T(9,75)
10    CONTINUE
C     WAIT FOR START SIGNAL
      WAIT X
C     INPUT DATA
      ACCEPT SFN
C     GET REFERENCE DATA
      DO 20 FN=1,75
      DO 20 K=1,9
      OUTPUT FN
C     GET DATA FROM REFERENCE WORD FEATURE SIGNAL STORE
      READ R(K,FN)
20    CONTINUE
C     GET FEATURE SIGNAL
      DO 30 FN=SFN,SNF+75
      DO 30 K=1,9
      OUTPUT FN
C     GET DATA FROM INPUT FEATURE SIGNAL STORE AT FRAME SFN
      READ T(K,FN-SNF+1)
C     NOTE DATA NORMALIZED TO FRAME 1 IN ARRAY
30    CONTINUE
C     EXECUTE DYNANMIC TIME WARP
      CALL DPWARP (9,R,75,T,75,DIJ)
      EFN=NFC+SFN
C     OUTPUT RESULTS
      OUTPUT EFN, DIJ
C     FINISHED OUTPUT DONE PULSE
      OUTPUT EX
      GO TO 1
      END
      SUBROUTINE DPWARP(ME,R,MM,T,NN,DR)
      COMMON/DWDATA/TMIN,TMAX,NFC,NFR,IDLT
      DIMENSION R(9,75),T(9,75)
      DIMENSION D(NMAX),DCU(NMAX)
      PARAMETER NMAX=20
      IDLT=5
      TMIN=.2
      TMAX=.6
      DATA XLRG/1000./
      IMIN(IMN)=MAX0(1,IMN-IDLT)
      IMAX(IMN)=MIN0(NN,IMN+IDLT)
C
C     INITIALIZE IR=1 COLUMN FIRST
C
      ITMN=3
      IT1=IMIN(ITMN)
      IT2=IMAX(ITMN)
      XDIST=10000.
      DO 60 IT=IT1,IT2
```

```
      CALL DIST(R,1,T,IT,DCU(IT-IT1+1))
      IF(DCU(IT-IT1+1).LT.XDIST)XDIXT=DCU(IT-IT1+1)
60    CONTINUE
      NFC=1
      DO 65 IT=IT2+1,NMAX
      DCU(IT-IT1+1)=XLRG
65    CONTINUE
      XMNR=10000.
      DO 200 IR=2,MM
      XMND=XLRG
      IT1P=IT1
      IT2P=IT2
      IT1=MAX0(IMIN(ITMN),IT1P)
      IT2=MAX0(IMAX(ITMN),IT2P)
      IF(IT2.GT.(IT2P+2))IT2=IT2P+2
      D1=XLRG
      D2=XLRG
      IF(IT1-1.GE.IT1P)D1=ABS(DCU(IT1-IT1P))
      IF(IT1-2.GE.IT1P)D2=ABS(DCU(IT1-IT1P-1))
      DO 20 IT=IT1,IT2
      CALL DIST(R,IR,T,IT,D(IT-IT1+1))
30    CONTINUE
56    CONTINUE
      DO 100 IT=IT1,IT2
      DO=ABS(DCU(IT-IT1P+1))
      DI=D2
      LPTH=2
      IF(D1-D2)10,11,11
10    LPTH=1
      DI=D1
11    IF(DO-DI)12,12,20
12    CONTINUE
      IF(IT.GT.1T2P) GO TO 21
      IF(DCU(IT-IT1P+1).LT.0)GO TO 20
      LPTH=0
      DI=DO
20    CONTINUE
21    CONTINUE
      DI=DI+D(IT-IT1+1)
      IF(XMND-DI)50,50,51
51    XMND=D1
      ITMN=IT
50    CONTINUE
      IF(LPTH.EQ.0)DI=-DI
      D2=D1
      D1=DO
      DCU(IT-IT1+1)=DI
100   CONTINUE
      IF(XMND.GE.XLRG)GO TO 300
      ITSAV=ITMN
      IF(IT2.LT.NN)GO TO 110
      DIN=XMND*FLOAT(MM)/FLOAT(IR)
      IF(XMNR.LT.DIN)GO TO 110
      XMNR=DIN
      IRR=IR
      ITT=ITMN
```

```
110   XTST=AMINI1(XMND,XMNR)
      THR1=(TMIN+((TMAX-TMIN)/(FLOAT(MM)-1))*FLOAT(IR))*MM
      IF(XTST.GT.THR1)GO TO 300
      IF(IT2-IT1+1.GT.NMAX) STOP-NMAX-TOO-SMALL
      DO 93 IT=IT2-IT1+2,NMAX
93    DCU(IT)=XLRG
200   CONTINUE
      NFC=ITSAV
      IF(XMND.GT.XNMR)NFC=ITT
      DR=AMIN1(XMND,SMNR)
      NFR=MM
      IF(XMND.GT.XMNR) NFR=IRR
      RETURN
300   DR=1000
      RETURN
      END
C     DIST--DISTANCE ROUTINE USING AUTOCORRELATION OF A'S
      SUBROUTINE DIST(CR,IR,CT,IT,DST)
      DIMENSION CR(9,75),CT(9,75)
      PARAMETER M=8,ME=M+1
C
C     CT=TEST ARRAY
C     M=8, ME=9
C     CR=NORMALIZED CORRELATION FUNCTION OF A'S
C       OF REFERENCE FRAME
C       CR(I)=2*COR(I)/COR(0) WHERE COR IS TRUE
C         CORRELATION OF A'S
C     RC=CR(1,IR)
C     TC=LOG RESIDUAL ERROR OF TEST FRAME
C     TC=CT(1,IT)
C
C     DST=RC+LOG(ACOR DOT R)-TC
C     FORM R DOT T AND STORE IN PR1
C
      RC=CR(1,IR)
      TC=CT(1,IT)
      PR1=0.
      DO 10 I=2,M
      PR1=PR1+CR(I,IR)*CT(I,IT)
10    CONTINUE
      PR1=PR1+1.
      IF(PR1,LT.1.E-5) PR1=1.E-5
      DST=ALOG(PR1)+RC-TC
      RETURN
      END
```

APPENDIX B

```
C     SENTENCE SELECTION PROGRAM
      DIMENSION D(22)
      CONST=.25
10    CONTINUE
C     WAIT FOR START SIGNAL
      WAIT E
C     INPUT DATA
      ACCEPT QS          ;FINAL STATE
      ACCEPT K           ;WORD POSITION
```

```
C     TRACEBACK SENTENCE
      D(K+1)=0
      Q2=QS
      DO 30 M=K,1,-1      ;COUNT BACKWARDS
      OUTPUT Q2,M
      ACCEPT QP,PHIS
      Q2=QP
      D(K)=PHIS-D(K-1)
30    CONTINUE
C     ORDER THE SCORES AND CALCULATE MEDIAN
      CALL SORTUP (D,K)
      XMED=(D(K/2)+D(K/2+1)/2.
      JMIN=1
      JMAX=K
C     ELIMINATE LAST IF AN OUTLIER
      DO 40 J=K,K/2+2,-1         ;COUNT BACKWARDS
      XTMP=(D(J)-D(J-1))/(D(K)-XMED)
      IF(XTMP .LE. CONST  ) GO TO 50
      JMAX=JMAX-1
40    CONTINUE
C     ELIMINATE THE FIRST IF AN OUTLIER
50    CONTINUE
      DO 60 J=1,K/2-2
      XTMP=(D(J+1)-D(J))/(XMED-D(1))
      IF(XTMP .LE. CONST  ) GO TO 70
      JMIN=JMIN+1
60    CONTINUE
70    CONTINUE
C     CALCULATE NEW PHIS
      PHIS=0
      DO 80 J=JMIN,JMAX
      PHIS=PHIS+D(J)
80    CONTINUE
C     COMPARE WITH OLD
      IF(PHIS.GT.PHISOLD) GO TO 500
      PHISOLD=PHIS
C     UPDATE SELECTED SENTENCE STORE
      Q2=QS
      DO 90 M=K,1,-1
      OUTPUT Q2,M
      OUTPUT WRITE PULSE TO SELECTED SENTENCE STORE
      ACCEPT QP
      Q2=QP
90    CONTINUE
      OUTPUT PHIS
C     UPDATE COMPLETE
500   CONTINUE
C     FINISHED OUTPUT DONE PULSE
      OUTPUT EE
      GO TO 10
      END
      SUBROUTINE SORTUP (A,N)
      DIMENSION A(N)
      IF(N.LE.1) RETURN
      DO 20 I=2,N
      IMI=I-1
```

```
        DO 10 J=1,IMI
        JJ=I-J
        IF(A(JJ).LE.A(JJ+1)) GO TO 20
        X=A(JJ)
        A(JJ)=A(JJ+1)
10      A(JJ+1)=X
20      CONTINUE
        RETURN
        END
```

We claim:

1. Apparatus for recognizing an utterance as one of a plurality of reference word sequences comprising:
   means (205) for storing a set of signals each representative of the acoustic features of a reference word;
   means (203) responsive to said utterance for generating a signal representative of the acoustic features of the utterance;
   means (411) for generating a set of first signals defining the plurality of sequences, each sequence being a series of reference words;
   means (427) for generating a succession of second signals identifying the successive word positions of the plurality of sequences;
   means (209, 425, 427) responsive to the set of first signals, the utterance feature signals and the reference word feature signals for producing a set of third signals each representative of the correspondence between said utterance and one of said sequences; and
   means (430) responsive to said third signals for selecting the sequence having the closest correspondence to said utterance;
   characterized in that
   said third signal producing means comprises:
   means (361) operative for each sequence in each word position identified by said second signals for storing a fourth signal representative of the word position utterance segment endpoint of said sequence;
   means (351,383,411) operative for each sequence in each word position jointly responsive to said first signals and stored fourth signal of the preceding word position of the sequence for selecting the utterance feature signals beginning at the preceding word position utterance segment endpoint of the sequence and the current word position reference word feature signals of the sequence; and
   means (209) jointly responsive to said sequence selected utterance feature signals and the sequence selected reference word feature signals for concurrently generating a fourth signal representative of the endpoint of the current word position utterance segment corresponding to the selected reference word, and a signal representative of the correspondence between the selected utterance segment feature signals from the preceding word position utterance segment endpoint for the sequence and the current word position selected reference word feature signals for the sequence.

2. Apparatus for recognizing an utterance as one of a plurality of reference word sequences according to claim 1;
   further characterized in that said closest corresponding sequence selecting means (430) includes:
   means (203) responsive to said utterance for generating a signal representative of the range of endpoints of said utterance;
   means (211,213,215) operative in each identified word position responsive to said first signals, said utterance endpoint range signal and the current word position utterance segment endpoint signal for each sequence, for detecting sequences which terminate in said word position and for identifying each terminating sequence having a current word position utterance segment endpoint within said utterance endpoint range as a candidate sequence for said utterance; and
   means (425,427,430) operative in each identified word position responsive to the correspondence signals of said candidate sequences for selecting and storing the candidate sequence having the closest correspondence to said utterance.

3. Apparatus for recognizing an utterance as one of a plurality of reference word sequences according to claim 2 further characterized in that
   said closest corresponding sequence selecting means (103,117,130,150) further comprises means (117) responsive to said second signals, said utterance endpoint range signal and said sequence current word position utterance segment endpoint signals for generating a signal corresponding to the occurrence of the final word position of said sequences; and
   means (150) responsive to said final word position occurrence signal for identifying the utterance as the last stored candidate sequence.

4. In a continuous speech recognizer that includes means for storing a set of first signals defining a plurality of predetermined sequences, each sequence being a series of reference words; means for storing a set of acoustic feature signals for each reference word; means for generating a succession of second signals identifying the successive word positions of said sequences; means for receiving an utterance; and means for generating a set of acoustic feature signals representative of said received utterance; a method for recognizing the received utterance as one of the plurality of reference word sequences comprising the steps of:
   producing a set of third signals each representative of the acoustic correspondence between said utterance and one of said sequences responsive to the set of first signals, the utterance acoustic feature signals and the reference word acoustic feature signals; and
   selecting the sequence having the closest acoustic correspondence to said utterance responsive to said third signals;
   characterized in that
   said third signal producing step comprises:

storing a fourth signal representing the utterance segment endpoint for each sequence of reference words in each word position identified by said second signals;

for each sequence in each successive word position identified by said second signals, selecting the utterance acoustic feature signals beginning at the preceding word position utterance segment endpoint for the sequence, and the acoustic feature signals of the current identified word position reference word for the sequence jointly responsive to the first signals and the stored fourth signal of the preceding word position for the sequence;

and concurrently generating a fourth signal representative of the endpoint of the current word position utterance segment corresponding to the selected reference word, and a signal representative of the acoustic correspondence between the current word position selected reference word for the sequence and the utterance segment from the preceding word position endpoint, said concurrent acoustic correspondence and fourth signal generation being jointly responsive to the current word position selected reference word acoustic feature signals for the sequence and the acoustic feature signals of the current word position selected utterance segment for the sequence.

5. A method for recognizing an utterance as one of a plurality of reference word sequences according to claim 4 characterized in that said closest corresponding sequence selecting step includes generating a signal representative of the range of endpoints of said utterance; responsive to the first signals in each identified word position, detecting sequences which terminate in said identified word position; jointly responsive to the utterance endpoint range signal and the current word position utterance portion endpoint signal for each terminating sequence in each identified word position, identifying each terminating sequence having its selected utterance portion endpoint within said utterance endpoint range as a candidate sequence for said utterance; and responsive to the correspondence signals of said candidate sequences in each identified word position, selecting and storing the candidate sequence having the closest correspondence to said utterance.

6. A method for recognizing an utterance as one of a plurality of reference word sequences according to claim 5 further characterized in that said closest corresponding sequence selecting step includes generating a signal corresponding to the occurrence of the final word position of said sequences responsive to said second signals, said utterance endpoint range signal, and said current word position utterance segment endpoint signals; and identifying the utterance as the last stored candidate sequence responsive to said final word position occurrence signal.

7. Apparatus for recognizing an utterance as one of a plurality of predetermined reference word sequences comprising:

means for storing a set of signals each representative to the acoustic features of a reference word;

means responsive to said utterance for generating a signal representative of the acoustic features thereof;

means for generating a set of first signals defining the plurality of reference word sequences, each first signal including a first state code, a second state code, and a reference word code connected from the first state code to the second state code and each sequence being a selected plurality of state connected reference word codes;

means for generating a succession of second signals identifying the successive word positions of the plurality of predetermined sequences;

means for generating a set of final state coded signals each identifying the final word position of one of said predetermined sequences;

means jointly responsive to said first signals, said utterance feature signals and said reference word feature signals, for producing a set of third signals each representative of the acoustic correspondence between said utterance and one of said predetermined reference word sequences; and means responsive to said third signals for selecting the sequence having the closest acoustic correspondence to said utterance;

said third signal producing means including:

means operative in each successive identified word position for storing a fourth signal representative of an utterance segment endpoint for each predetermined reference word sequence in said word position;

means operative in each successive identified word position responsive to said first signals and to the stored fourth signal of the sequence in the preceding word position for selecting the current identified word position reference word for each sequence and for selecting the utterance feature signals beginning at the utterance segment endpoint of the sequence in the preceding word position;

means jointly responsive to the feature signals of the selected reference word and the feature signals of the utterance segment beginning at the stored endpoint for the immediately preceding word position of the sequence for concurrently generating a fourth signal representative of the endpoint of the current identified word position utterance segment corresponding to the selected reference word, and a signal representative of the correspondence between the feature signals of the sequence selected reference word and the feature signals of utterance segment from the immediately preceding word position endpoint;

and means for combining the current word position sequence reference word correspondence signal with the correspondence signal of the preceding word positions of the same sequence to form a cumulative correspondence signal for each sequence in each word position.

8. Apparatus for recognizing an utterance as one of a plurality of predetermined reference word sequences according to claim 7 further comprising means responsive to said utterance feature signals for generating a signal corresponding to the endpoint of said utterance; and wherein said means for selecting the sequence having the closest acoustic correspondence with said utterance comprises means operative in each word position responsive to said final state coded signals for detecting the sequences ending in said word position; means jointly responsive to said utterance endpoint signal and said detected sequence current word position utterance segment endpoint signals for selecting detected sequences having current word position utterance segment endpoints within a predetermined range of said utterance endpoint as candidate sequences for said utterance; and means responsive to the cumulative correspondence signals of said candidate sequences for selecting and storing the candidate sequence with the closest correspondence to said utterance in said current word position and said preceding word positions.

9. Apparatus for recognizing an utterance as one of a plurality of predetermined reference word sequences according to claim 8 further comprising means responsive to said second signals for generating a signal corresponding to the occurrence of the final word position of said sequences; and means responsive to said final word position occurrence signal for identifying the utterance as the last stored candidate sequence.

10. Apparatus for recognizing a continuous speech pattern as one of a plurality of predetermined reference word sequences comprising:
   means for generating a set of first signals defining the plurality of predetermined sequences, each sequence defining signal including a first state signal, a second state signal and a reference word code linked from said first state to said second state and each sequence being a series of selected state connected reference word codes terminating in an end state;
   means for generating a succession of second signals identifying the successive reference word positions of said sequences;
   means for generating a signal representative of each sequence end state;
   means responsive to each reference word for generating and storing a set of signals representative of the acoustic features of said reference word;
   means responsive to said continuous speech pattern for generating signals representative of the acoustic features of said speech pattern;
   means jointly responsive to said first signals, said reference word feature signal sets, and the feature signals of said continuous speech pattern for producing a set of third signals each representative of the correspondence between said continuous speech pattern and one of the reference word sequences; and
   means responsive to said third signals for identifying the continuous speech pattern as the closest corresponding reference word sequence;
   said third signal producing means comprising:
   means operative in each word position for storing a fourth signal representing the word position speech pattern segment endpoint for each reference word sequence;
   means operative for each sequence in each successive word position identified by said second signals jointly responsive to said first signals and the stored fourth signal of the preceding word position of the sequence for selecting the speech pattern feature signals beginning at the preceding word position speech pattern segment endpoint of the sequence, and for selecting the current identified word position reference word feature signals of each sequence;
   means jointly responsive to the feature signal set of the sequence selected reference word and the feature signals of the continuous speech pattern segment beginning at the stored speech pattern endpoint of the immediately preceding word position of the sequence for concurrently generating a fourth signal representative of the endpoint of the current identified word position continuous speech pattern segment corresponding to the selected reference word and a signal representative of the correspondence between the feature signals of the sequence selected reference word and the feature signals of the continuous speech pattern segment from the immediately preceding word position speech pattern endpoint of the sequence, said segment generated fourth signal in the current word position being stored in said endpoint storing means as the preceding word position endpoint signal for the next occurring word position.

11. Apparatus for recognizing continuous speech pattern as one of a plurality of predetermined reference word sequences according to claim 10 further comprising means responsive to said continuous speech pattern for generating a signal representative of the range of endpoints of said speech pattern; means operative in each word position responsive to said sequence end state signals for detecting sequences which terminate in said word position; means jointly responsive to said utterance endpoint range signal and the current word position selected speech pattern segment endpoint signal of each terminating sequence for identifying each terminating sequence having its endpoint within said utterance endpoint range as a candidate sequence for said utterance; and means operative in each identified word position responsive to the correspondence signals of said candidate sequences for detecting and storing the candidate sequence having the closest correspondence to said continuous speech pattern in said identified word position and said preceding identified word positions.

12. Apparatus for recognizing a continuous speech pattern as one of a plurality of predetermined reference word sequences according to claim 11 wherein said continuous speech pattern identifying means comprises means operative in each identified word position responsive to said speech pattern endpoint range signal and said selected speech pattern segment endpoint signals in said current word position for detecting the final word position of said sequences; and means responsive to the operation of said final word position detecting means for selecting the last stored candidate sequence as the continuous speech pattern.

13. In a continuous speech pattern recognition circuit that includes means for storing a set of first signals syntactically defining a plurality of predetermined reference word sequences, each sequence being a selected series of reference words and each first signal comprising a reference word code and a pair of state codes identifying the position of the reference word in said sequences; means for generating a succession of second signals identifying the successive word positions of said sequences; means for storing a set of acoustic feature signals for each reference word; means for receiving a continuous speech pattern; and means for generating a set of acoustic feature signals corresponding to said speech pattern;
   a method for recognizing the speech pattern as one of said plurality of predetermined reference word sequences comprising the steps of:
   producing a set of third signals each representative of the acoustic correspondence between said speech pattern and one of said reference word sequences jointly responsive to said first signals, the acoustic feature signal sets of said reference word and the acoustic feature signal set for said speech pattern;

and responsive to the third signals for the sequences, identifying the speech pattern as the reference word sequence having the closest acoustic correspondence to said utterance;

said third signal producing step comprising:

for every sequence in each word position, storing a fourth signal representative of the speech pattern segment endpoint corresponding to the sequence in said word position;

for each sequence in each successive word position identified by said second signals, selecting the speech pattern acoustic feature signals beginning at the preceding word position speech pattern endpoint for the sequence and selecting the acoustic feature signals of the current word position reference word of the sequence, jointly responsive to the first signals and the stored fourth signal of the preceding word position for the sequence;

and concurrently generating a fourth signal representative of the endpoint of the current word position speech segment corresponding to the selected reference word and a signal representative of the acoustic correspondence between the current word position selected reference word for the sequence and the speech pattern segment beginning at the preceding word position endpoint jointly responsive to the current word position selected reference word acoustic feature signals for the sequence and the acoustic feature signals of the selected speech pattern segment for the sequence.

14. A method for recognizing a speech pattern as one of the plurality of the predetermined reference word sequences according to claim 13 wherein said speech pattern identifying step includes generating a signal representative of the range of endpoints of said speech pattern; responsive to said first signals in each identified word position, detecting the sequences which terminate in said word position; jointly responsive to the speech pattern endpoint range signal and said selected speech pattern segment endpoint signal for each terminating sequence in said identified word position, identifying each terminating sequence having its word position selected speech pattern segment endpoint within said speech pattern endpoint range as a candidate sequence for said speech pattern; and responsive to the correspondence signals of said candidate sequences in each identified word position, selecting and storing the candidate sequence having the closest correspondence to said speech pattern in said current identified word position and said preceding identified word positions.

15. A method for recognizing a speech pattern as one of the plurality of predetermined reference word sequences according to claim 14 wherein said speech pattern identifying step includes generating a signal corresponding to the occurrence of the word position in which said speech pattern endpoint occurs jointly responsive to the selected speech pattern segment endpoint signals in each identified word position and said speech pattern endpoint range signal; and identifying the speech pattern as the last stored candidate sequence responsive to said speech pattern endpoint occurrence word position signal.

* * * * *

UNITED STATES PATENT AND TRADEMARK OFFICE
CERTIFICATE OF CORRECTION

PATENT NO. : 4,277,644

DATED : July 7, 1981

INVENTOR(S) : Stephen E. Levinson and Frank C. Pirz

It is certified that error appears in the above-identified patent and that said Letters Patent are hereby corrected as shown below:

In the Abstract, line 2, after "sequence-defining" insert --(syntax)--. Column 1, line 62, "4,156,860" should read --4,156,868--. Column 3, line 45, after "to" insert --one--. Column 8, line 16, "$F_{E1} < F_{E2}$" should read --$F_{E_1} < F_{E_2}$--. Column 9, line 67, "waveorm" should read --waveform--. Column 16, line 13, "$w_{26}$-how" should read --$w_{26}$=how--. Column 18, line 48, "is" should read --and--. Column 22, line 32, "fvom" should read --from--; lines 33-34, "feginning" should read --beginning--. Column 24, line 42, "liklihood" should read --likelihood--. Column 27, line 34, "firs" should read --first--. Column 28, line 28, "k" should read --$\underline{k}$--; line 29, "k" should read --K--. Column 37, line 67, "characterized in that" should read --CHARACTERIZED IN THAT--. Column 38, line 33, "characterized in that" should read --CHARACTERIZED IN THAT--; line 67, "characterized in that" should read --CHARACTERIZED IN THAT--. Column 39, line 39, "portion" should be --segment--; line 51, "characterized in that" should read --CHARACTERIZED IN THAT --.

Signed and Sealed this

Sixteenth Day of March 1982

[SEAL]

Attest:

GERALD J. MOSSINGHOFF

Attesting Officer    Commissioner of Patents and Trademarks